US011995604B2

(12) United States Patent
Stroh et al.

(10) Patent No.: US 11,995,604 B2
(45) Date of Patent: May 28, 2024

(54) DETERMINATION OF INTERMEDIATE SORTATION OR WAREHOUSING FACILITY LOCATION

(71) Applicant: Target Brands, Inc., Minneapolis, MN (US)

(72) Inventors: Alexander Stroh, Minneapolis, MN (US); Karthik Rajpurohit, Minneapolis, MN (US); James Patrick Perrone, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 17/868,473

(22) Filed: Jul. 19, 2022

(65) Prior Publication Data
US 2024/0029011 A1     Jan. 25, 2024

(51) Int. Cl.
*G06Q 10/087*     (2023.01)
*G06Q 10/04*     (2023.01)
(Continued)

(52) U.S. Cl.
CPC ....... *G06Q 10/08355* (2013.01); *G06Q 10/04* (2013.01); *G06Q 10/0838* (2013.01); *G06Q 10/087* (2013.01)

(58) Field of Classification Search
CPC ............. G06Q 10/08355; G06Q 10/04; G06Q 10/0838; G06Q 10/087
(Continued)

(56) References Cited

U.S. PATENT DOCUMENTS 8,554,694 B1   10/2013   Ward et al.
10,909,486 B1   2/2021   Tsou
(Continued)

FOREIGN PATENT DOCUMENTS

KR     102290966 B1     8/2021
WO     2015143427 A1    9/2015

OTHER PUBLICATIONS

"An integrated model for site selection and space determination of warehouses" Published by Elsevier (Year: 2015).*
(Continued)

*Primary Examiner* — Zeina Elchanti
(74) *Attorney, Agent, or Firm* — Merchant and Gould, PC

(57) ABSTRACT

The present application describes a method of utilizing a mathematical model to determine appropriate locations for redistribution or drop-off of items with last mile delivery services at a consolidation point representing an intermediate sortation or warehousing in a retail enterprise's supply chain downstream of retail locations. Items may be brought from a consolidation point, such as a warehouse downstream of retail locations, to such a redistribution location (herein referred to as a "Transload" point). A last-mile delivery carrier may pick up items from the Transload point and deliver them to customer delivery locations in the geographical area served by the Transload point. In examples, relocation of selected deliveries from the consolidation point to a Transload point reduces the per-mile cost for last mile deliveries. A model uses candidate locations to assess optimal locations for such a Transload facility, for example, based on delivery locations and associated costs.

21 Claims, 11 Drawing Sheets

(51) Int. Cl.
*G06Q 10/083* (2023.01)
*G06Q 10/0835* (2023.01)

(58) Field of Classification Search
USPC .......................................................... 705/338
See application file for complete search history.

(56) References Cited

U.S. PATENT DOCUMENTS

| 11,144,870 | B2 | 10/2021 | Loubriel |
| 2012/0166247 | A1 | 6/2012 | Tu et al. |
| 2015/0269520 | A1 | 9/2015 | Knapp et al. |
| 2018/0247266 | A1 | 8/2018 | Knapp et al. |
| 2022/0036305 | A1* | 2/2022 | Glick ................ G06Q 10/0875 |

OTHER PUBLICATIONS

Srinivas, S. Srivatsa et al., Moving towards "mobile warehouse": Last-mile logistics during COVID-19 and beyond, Transportation Research Interdisciplinary Perspectives, 2021, 6 Pages.

Leyerer, Max et al., Shortening the Last Mile in Urban Areas: Optimizing a Smart Logistics Concept for E-Grocery Operations, School of Economics and Management, Leibniz University (Hannover, Germany), Jul. 2, 2020, 19 Pages.

Olsson, John et al., Framework of Last Mile Logistics Research: A Systematic Review of the Literature, Lund University, Department of Design Sciences (Lund, Sweden), Dec. 12, 2019, 25 Pages.

Veličković, Marko et al., Different Urban Consolidation Centre Scanarios: Impact On External Costs of Last-Mile Deliveries, Dept. of Traffic Engineering, Faculty of Technical Sciences, University of Novi Sad, Serbia, Sep. 4, 2017, 12 Pages.

Dueñas, Daniel Esteban Merchán, Transshipment Networks for Last-Mile Delivery in Congested Urban Areas, Submitted to the Engineering Systems Division on May 8, 2015 in partial fulfillment of the requirements for the degree of Master of Science in Engineering systems), 61 Pages.

Ashrafzadeh, Maysam et al., Application of fuzzy TOPSIS method for the selection of Warehouse Location: A Case Study, Interdisciplinary Journal of Contemporary Research in Business (vol. 3, No. 9), Jan. 2012, 17 Pages.

* cited by examiner

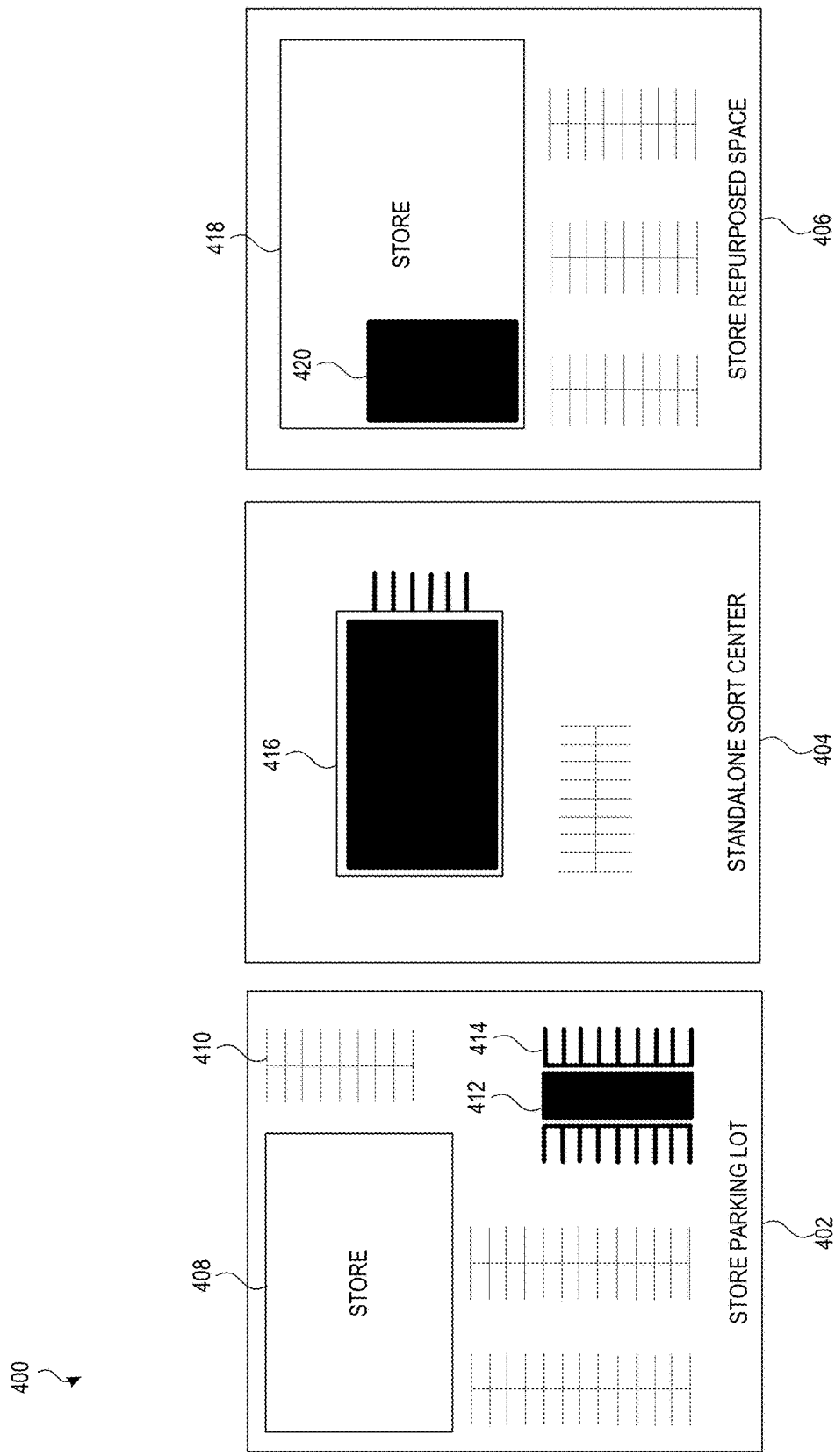

DETERMINATION OF INTERMEDIATE SORTATION OR WAREHOUSING FACILITY LOCATION

BACKGROUND

An enterprise, such as a retail or grocery enterprise, may offer a ship-to-home or other ordering scheme which requires items be delivered from an item source to the final customer delivery location. These deliveries have associated shipping costs, including travel costs, fuel costs, personnel costs, and others. Because of this, certain customer delivery locations may be better suited for ship-to-home or same-day ship-to-home delivery of items, and for other customer delivery locations these options may not be financially feasible or beneficial to the company.

In some instances, a retailer may elect to establish a consolidation point, such as a small-scale warehouse, downstream within the retailer supply chain from retail locations. This may be optimal in areas where retail locations are closely spaced, and where the retailer has both in-store and online sales. In such cases, items may be in stock at fewer than all retail locations and use of the downstream consolidation point allowed the retailer to consolidate items from multiple retail locations into a single "last mile" shipment to the customer.

The use of such a consolidation point may reduce shipping costs by combining items into fewer overall packages and shipments. However, on average, use of such a consolidation point may result in deliveries within the area (typically a city or densely populated area) to be fulfilled from a greater distance, since the consolidation location may, on average, be further away from a customer address than a store or other retail supply chain node that might be closer to the customer delivery address.

Furthermore, a retail enterprise may struggle to identify, within a densely populated area, a specific boundary or area where expedited delivery services (e.g., same day delivery) are cost effective, and where such expedited delivery services are not cost effective. This becomes even more difficult to determine when a retail enterprise delivers goods to customers from a mix of retail locations, warehouses upstream of those retail locations, in which the selection of a particular fulfillment location may affect the analysis of whether it is practicable and cost-efficient to offer such expedited delivery services. There does not exist a methodological way to accurately and reliably, for that organization, determine appropriate delivery zones for consolidation locations in such areas.

SUMMARY

In some examples, an enterprise may wish to optimize or increase efficiency of item delivery and increase the number of customer delivery locations who may be served by certain types of an enterprise's delivery services, such as expedited delivery services. In some examples, this disclosure relates to utilizing a mathematical model to determine appropriate locations for redistribution or drop-off of items with last mile delivery services when handled or at a consolidation point representing an intermediate sortation or warehousing in a retail enterprise's supply chain downstream of retail locations. Items may be brought from a consolidation point, such as a warehouse downstream of retail locations, to such a redistribution location (herein referred to as a "Transload" point). A last-mile delivery carrier may pick up items from the Transload point and deliver them to customer delivery locations in the geographical area served by the Transload point.

In examples, relocation of selected deliveries from the consolidation point to a Transload point reduces the per-mile cost for last mile deliveries. A model uses candidate locations to assess optimal locations for such a Transload facility, for example, based on historical and/or projected delivery locations and associated costs.

In some examples, the model may group customer delivery locations of a geographical area into clusters based on minimizing an overall shipping cost to each customer delivery location. In some examples, the number of customer delivery locations which can be served by ship-to-home or same-day ship-to-home delivery is higher when one or more Transload points are utilized than when none are utilized. In some examples, the model may, in combination with throughput constraints and use of a "dummy" node having a separate, fixed, delivery cost may determine that in some instances, no last-mile delivery services should be offered in particular customer delivery locations.

Accordingly, the present application describes a computing system, including at least one processor and at least one memory storing computer-executable instructions for determining transload locations for fulfilling ship-to-home deliveries of an enterprise. In some examples, the computer-executable instructions, when executed by the at least one processor, cause the computer to receive ship-to-home transaction data associated with a time period; define a geographical area in which there are: a plurality of candidate customers for ship-to-home deliveries, each of the plurality of candidate customers having a delivery location, and a warehouse; receive a set of candidate transload locations within the geographical area; and receive a number of candidate transload locations to be selected from among the set of candidate transload locations. In some examples, the instructions may also cause the computer to select transload locations from among the set of candidate transload locations, where the transload locations minimize a shipping cost of delivering an item to the each delivery location, where the shipping cost is a minimum aggregated value selected from between: a minimized direct delivery cost of the item from the warehouse to each delivery location, and a minimized transload delivery cost that includes at least (1) a minimized intermediate delivery cost of shipping the item from the warehouse to the selected transload of the candidate transload locations, and (2) a minimized final delivery cost of the item from the selected transload locations of the set of candidate transload locations to each delivery location. The instructions may also cause the computer to assign regions within the geographical area to either the one of the selected transload locations or to the warehouse, each region containing one or more of the delivery locations.

The present application describes a computing system, including at least one processor and at least one memory storing computer-executable instructions for determining transload locations for fulfilling ship-to-home deliveries of an enterprise. In an example, the computer-executable instructions, when executed by the at least one processor, cause the computer to receive ship-to-home transaction data associated with a time period; define a geographical area in which there are: a plurality of candidate customers for ship-to-home deliveries, each of the plurality of candidate customers having a delivery location, and a warehouse; receive a set of candidate transload locations within the geographical area; and receive a number of candidate transload locations to be selected from among the set of candidate transload locations. In some examples, for each candidate group of delivery source locations of a plurality of eligible candidate groups of delivery source locations, where the eligible candidate groups of delivery source locations each represent a different combination of candidate transload locations and the warehouse location, the instructions may cause the computer to group the delivery locations of each of the plurality of candidate customers into a plurality of clusters, the plurality of clusters assigning each of the plurality of candidate customers to one of the delivery source locations of the candidate group by minimizing a shipping cost for shipping an item from the warehouse to the delivery location, either directly or via one of the candidate transload locations within the group of delivery locations. In some examples, minimizing the shipping cost includes selecting either a minimized direct delivery cost of an item from the warehouse to each delivery location, or a minimized transload delivery cost that includes at least (1) a minimized intermediate delivery cost of shipping an item from the warehouse to the one of the candidate transload locations; and (2) a minimized final delivery cost of an item from the one of the candidate transload locations to each delivery location. In some examples, shipping costs may be aggregated to each of the delivery locations for the candidate group, and a candidate group may be selected from among the plurality of eligible candidate groups having a lowest aggregated shipping cost to the plurality of candidate customers. The instructions may also cause the computer to assign each delivery location to either the warehouse or to one of the transload locations within the selected candidate group, based on the cluster of the plurality of clusters that the delivery location is grouped into for the selected candidate group.

The present application describes a method including receiving ship-to-home transaction data associated with a time period; defining a geographical area in which there are: a plurality of candidate customers for ship-to-home deliveries, each of the plurality of candidate customers having a delivery location, and a warehouse; receiving a set of candidate transload locations within the geographical area; and receiving a number of candidate transload locations to be selected from among the set of candidate transload locations. In some examples, for each candidate group of delivery source locations of a plurality of eligible candidate groups of delivery source locations, where the eligible candidate groups of delivery source locations each represent a different combination of candidate transload locations and the warehouse location, the delivery locations of each of the plurality of candidate customers may be grouped into a plurality of clusters, the plurality of clusters assigning each of the plurality of candidate customers to one of the delivery source locations of the candidate group by minimizing a shipping cost for shipping an item from the warehouse to the delivery location, either directly or via one of the candidate transload locations within the group of delivery locations. In some examples, minimizing the shipping cost includes selecting either a minimized a direct delivery cost of an item from the warehouse to each delivery location, or a minimized transload delivery cost that includes at least (1) a minimized intermediate delivery cost of shipping an item from the warehouse to the one of the candidate transload locations; and (2) a minimized final delivery cost of an item from the one of the candidate transload locations to each delivery location. In some examples, shipping costs may be aggregated to each of the delivery locations for the candidate group, and a candidate group may be selected from among the plurality of eligible candidate groups having a lowest aggregated shipping cost to the plurality of candidate customers. Each delivery location may be assigned to either the warehouse or to one of the transload locations within the selected candidate group, based on the cluster of the plurality of clusters that the delivery location is grouped into for the selected candidate group.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 4 illustrates example categories of transload locations, according to an example.

DETAILED DESCRIPTION

Figure 1:
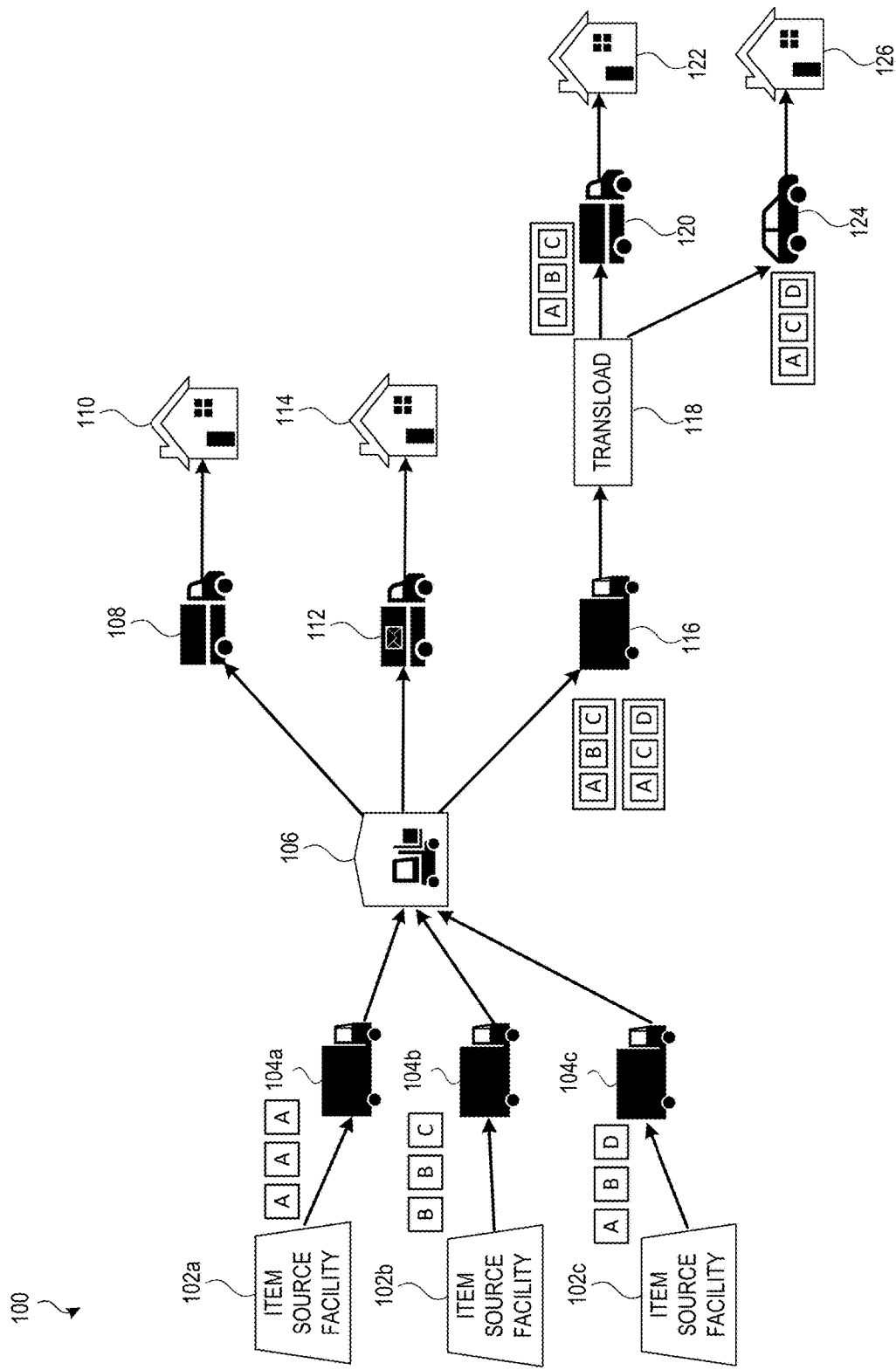
FIG. 1 illustrates an example system for fulfilling deliveries of an enterprise from a warehouse to a customer, according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In some examples, the subject matter of this disclosure relates to utilizing a model to determine appropriate locations (herein referred to as "Transload" locations) for consolidated relocation and redistribution to last mile delivery services, from intermediate sortation or warehousing facilities, as well as determining which customer delivery locations may be served by Transload points. An enterprise, such as a retail or grocery enterprise, may offer a ship-to-home or other ordering scheme which requires items be delivered from an item source (such as a store or manufacturer) to a warehouse for order consolidation and then to the final customer delivery location (such as a customer home, business, or other final delivery destination). These deliveries may have associated shipping costs, including travel costs, fuel costs, personnel costs, vehicle maintenance costs, and others. Because of this, certain customer delivery locations may be better suited for ship-to-home or same-day ship-to-home delivery of items, and for other customer delivery locations these options may not be financially feasible or beneficial to the company. A model which can determine appropriate locations for Transload points within a geographical area may help an enterprise to increase efficiency of item delivery and increase the number of customer delivery locations who may be served by particular types of enterprise delivery services (e.g., last mile delivery services such as expedited, or same-day, delivery services).

In example implementations, maximizing the number of customer delivery locations who are eligible for these options may increase customer satisfaction and repeat customer patronage. Including one or more intermediate sortation or warehousing facilities in a geographical area served by at least one warehouse may increase the efficiency of item delivery to customer delivery locations. A model which can determine appropriate locations for Transload points within a geographical area may help an enterprise to increase efficiency of item delivery and increase the number of customer delivery locations who may be served by the enterprise's delivery services.

In general, this disclosure relates to utilizing a mathematical model to determine appropriate locations for Transload points, which may be used in conjunction with a warehouse (for example, a mixing center, sortation facility, storage warehouse, or other appropriate warehouse). In some examples, Transload points may be in the form of a stand-alone building, a location in a parking lot of an enterprise store, within an enterprise store, or in another appropriate location. Items may be brought (for example, on a large container truck or semi-truck) from a warehouse or other order consolidation point to a Transload point. A plurality of last mile delivery carriers (for example, a vehicle of a service such as Shipt) or other appropriate delivery vehicles may pick up items from the Transload point and deliver them to customer delivery locations in the geographical area served by the Transload point.

In some examples, the model may group customer delivery locations of a geographical area into clusters based on minimizing an overall shipping cost to each customer delivery location. In some examples, each customer delivery location may be assigned to a cluster which may receive items delivered directly from a warehouse or through a Transload point. In some examples, the number of customer delivery locations which can be served by ship-to-home or same-day ship-to-home delivery is higher when one or more Transload points are utilized than when none are utilized (all items are delivered directly from the warehouse).

This may allow an enterprise to increase efficiency (and associated economic benefits) of item delivery and increase the number of customer delivery locations who may be served by the enterprise's delivery services, which may benefit multiple parties: this may provide an improved experience to customers, more of whom may be eligible to receive item deliveries at home or work, and may receive them quicker; driver delivery experience may also be improved and there may be more demand for drivers; carrier capacity may be increased, leading to increased business for carriers. Additionally, a user interface which maps deliveries to transload points may be improved, improving efficiency of supply chain operations.

In some examples, the model may, in combination with throughput constraints and use of a "dummy" node having a separate, fixed, delivery cost may determine not only that including one or more transload points may extend last-mile delivery services to more customer delivery locations, but also that in some instances, no last-mile delivery services should be offered in particular customer delivery locations. In some examples, this may eliminate manual determination and adjustment of the number of customer delivery locations which last-mile delivery services will be offered to.

These and other examples will be explained in more detail below with respect to FIG. 1-FIG. 10.

FIG. 1 illustrates an example system 100 for fulfilling deliveries of an enterprise from a warehouse to a customer, according to an example. As will be described in more detail below, the system 100 may include item source facilities 102a-c, large container trucks 104a-c, 116, a warehouse 106, last-mile delivery vehicles 108, 120, 124, customer delivery locations 110, 114, 122, 126, a national courier vehicle 112, and Transload point 118.

In some examples, item source facility 102 may be a store, manufacturing or assembly facility, warehouse, shipping port, or other source of items. Item source facility 102 may make, assemble, and/or store items. In some examples, items may be picked up from item source facility 102a-c and shipped to warehouse 106 by a large container truck 104a-c. Large container trucks 104a-c, 116 may be associated with a private or government carrier and may be a vehicle such as a semi-trailer truck, a box truck, a flatbed truck, or other suitable cargo vehicle. Warehouse 106 may be a mixing center, sortation center, distribution center, pack and ship warehouse, or other appropriate warehouse type. Warehouse 106 may store and/or sort items to be delivered to enterprise locations and/or customer delivery locations. In some examples, warehouse 106 may sort items for customer delivery locations into groups of items which may be grouped by customer, delivery location, or delivery route (for example, delivery route of a last-mile delivery vehicle where the delivery route includes delivery of items to multiple customers/delivery locations). In some examples, grouped items may be placed in a pre-sorted cart.

In some examples, items destined for customer delivery location 110 may be loaded onto last-mile delivery vehicle 108 and transported directly from warehouse 106 to customer delivery location 110. In some examples, last-mile delivery vehicles 108, 120 may be associated with private or governmental last-mile delivery companies (for example, Shipt, Onfleet, Postmates, or any other appropriate examples). In some examples, last-mile delivery vehicles 108, 120 may be a box truck, a cargo van, a walk-in truck, or other appropriate vehicle type. In some examples, last-mile delivery vehicles 108, 120 may be non-standard motorized vehicle (for example, drones), or a non-motorized vehicle or other non-motorized method of delivery (for example, bicycles or on-foot couriers). In some examples, customer delivery locations 110, 114, 122, 126 may be customer homes, drop-off lockers, mailboxes, businesses, or other appropriate delivery locations.

In some examples, items destined for customer delivery location 114 may be loaded onto national courier vehicle 112 and transported directly from warehouse 106 to customer delivery location 114. In some examples, national courier vehicle 112 may perform last-mile delivery functions and may be associated with private or governmental courier companies (for example, Fed-Ex, UPS, DHL, the United States Postal Service, or any other appropriate examples). In some examples, national courier vehicle 112 may be a box truck, a cargo van, a walk-in truck, or other appropriate vehicle type.

In some examples, items destined for customer delivery location 122 may be loaded onto large container truck 116 and transported from warehouse 106 to Transload point 118. In some examples, pre-sorted carts of items destined for customer delivery location 122 may be loaded onto large container truck 116 and transported from warehouse 106 to Transload point 118. In some examples, Transload point 118 may be an intermediate sortation or warehousing facility and may be in the form of a standalone building, a location in a parking lot of an enterprise store, within an enterprise store, or in another appropriate location. In some examples, Transload point 118 may store, on a short-term basis, items which are to be delivered to customer delivery locations 122, 126. The items may then be loaded onto last-mile delivery vehicles 120, 124 (or, in some examples, a national courier vehicle such as national courier vehicle 112) for delivery to customer delivery location 122. Items which are in a pre-sorted cart may be removed from the cart before being loaded into last-mile delivery vehicles 120, 124.

In some examples, items delivered to Transload point 118 may be mixed or sorted prior to being pick-up for delivery by last-mile delivery vehicles 120, 124 to customer delivery location 122. In some examples, items delivered to Transload point 118 may be cartonized or packaged as a complete order ready for pick-up and then delivery by last-mile delivery vehicles 120, 124 to customer delivery location 122 without sorting or mixing. In some examples, the items may be grouped onto a cart as a complete order or by delivery route of last-mile delivery vehicles 120, 124. In some examples, after items have been removed from a cart and loaded onto last-mile delivery vehicles 120, 124, the empty cart may be transported back to warehouse 106 where it may be loaded with a new group of pre-sorted items. In some examples, a Transload point 118 may reside downstream of a mixing center, sortation center, or warehouse in an enterprise supply chain. In some examples, a Transload point 118 may reside downstream of a store (may receive items from a store which are to be picked up for delivery by last-mile delivery vehicles 120, 124 to customer delivery location 122) in an enterprise supply chain.

In some examples, items may refer to edible or non-edible goods or products. In some examples, items may be perishable, such as certain grocery items; in some examples, items may be non-perishable, such as household products or clothing; in some examples, items may be large, such as furniture; in some examples, items may require refrigeration, freezing, heating, or other means of temperature control.

In some examples, large container trucks may be capable of carrying more items than national courier vehicles or other last-mile delivery vehicles. In some examples, because of the ability to carry more items, the large container trucks may correspond to a lower shipping/transport cost per item per mile.

An example flow through the system 100, which represents a portion of a retail enterprise supply chain, is as follows. In an example implementation, item source facilities 102a-c may represent retail locations (e.g., stores) that carry items for sale. Each store may have the same collection of items or may carry different collections of items. Furthermore, the retail organization may be capable of receiving online orders for items to be delivered to customer locations. In such cases, the online orders may be fulfilled from in-stock items at the item source facilities 102a-c. Certain items may be in stock at one store, but out of stock at another store, at least at the time an online order is received.

In the example scenario shown, a first item source facility 102a carries item A, a second item source facility 102b carries items B and C, and a third item source facility 102c carries items A, B, and D. A customer associated with customer delivery location 122 may place an online order for items A, B, and C, and another customer associated with customer delivery location 126 may place an online order for items A, C and D.

In this instance, order processing software may identify items in stock at the item source facilities, and schedule delivery of those items to the respective customer delivery locations 122, 126. In a typical case, order processing software might fulfill the order of items A, B, and C by the customer at customer delivery location 122 by sending two messages: a first message to item source facility 102a to ship item A directly to customer delivery location 122, and a second message to item source facility 102b to ship items B and C to customer delivery location 122. However, this is generally inefficient, since the items A, B, and C are sent in separate packages, thereby increasing packaging costs. Furthermore, item source facilities 102a, 102b may be the closest locations to the customer delivery location 122, but one or both may be relatively far away, such that per-mile delivery costs for expedited shipping (e.g., same day delivery) may be relatively high. Similar problems may occur with the order for items A, C, and D for delivery to customer delivery location 126, because items may need to be shipped from both item source facility 102b and item source facility 102c.

In example implementations of an enterprise supply chain, a warehouse 106 may be placed "downstream" of retail locations represented by item source facilities 102a-c, and may operate as an order consolidation location, or "mixing center". The warehouse 106 may receive daily or more frequent large capacity shipments of items from the item source facilities 102a-c and may perform a sortation process to consolidate items into shipment packages for delivery to customer locations. In the example shown, the warehouse 106 may form order packages for each customer location, for example by sorting and cartonizing items received from the item source facilities 102a-c in accordance with the intended customer delivery location.

In a typical case, as described previously, delivery of items from a warehouse 106 may be inefficient, since the warehouse 106 may be located generally within a metropolitan area that includes the customer delivery locations 122, 126, but may be so far away (or locations 122, 126 spaced so far apart) that expedited delivery may be cost prohibitive. In such cases, a last-mile delivery cost may be reduced by introducing a Transload point 118, and a defined transit route between the warehouse 106 and the Transload point 118. Where there is sufficient volume, a high-volume vehicle, such as large container truck 116, may be used to move items to the Transload point 118, which reduces the distance for last mile delivery by that receives a subset of the cartonized deliveries, and redistributes those deliveries to smaller, last-mile delivery vehicles 120, 124. Those last-mile delivery vehicles 120, 124 may then receive cartonized deliveries, and transport them to respective customer delivery locations 122, 126.

Overall, selection and use of Transload points in efficient locations affords a retailer an opportunity to reduce the average cost per mile of delivery from warehouse 106 to customer delivery locations 122, 126, depending on the specific location of the Transload point 118, as well as fixed and variable costs for operating such a Transload point. The present application provides various computational platforms for managing selection of Transload points, as well as order routing within a geographical area including such Transload points. Specifically, the present application provides an efficient, flexible analysis and modeling tool for identifying opportunities to introduce Transload points within a supply chain network, as well as to define specific areas or locations within a given geographical region at which specific delivery services, such as expedited or same-day delivery services, can be offered practically by a retail organization.

Figure 2:
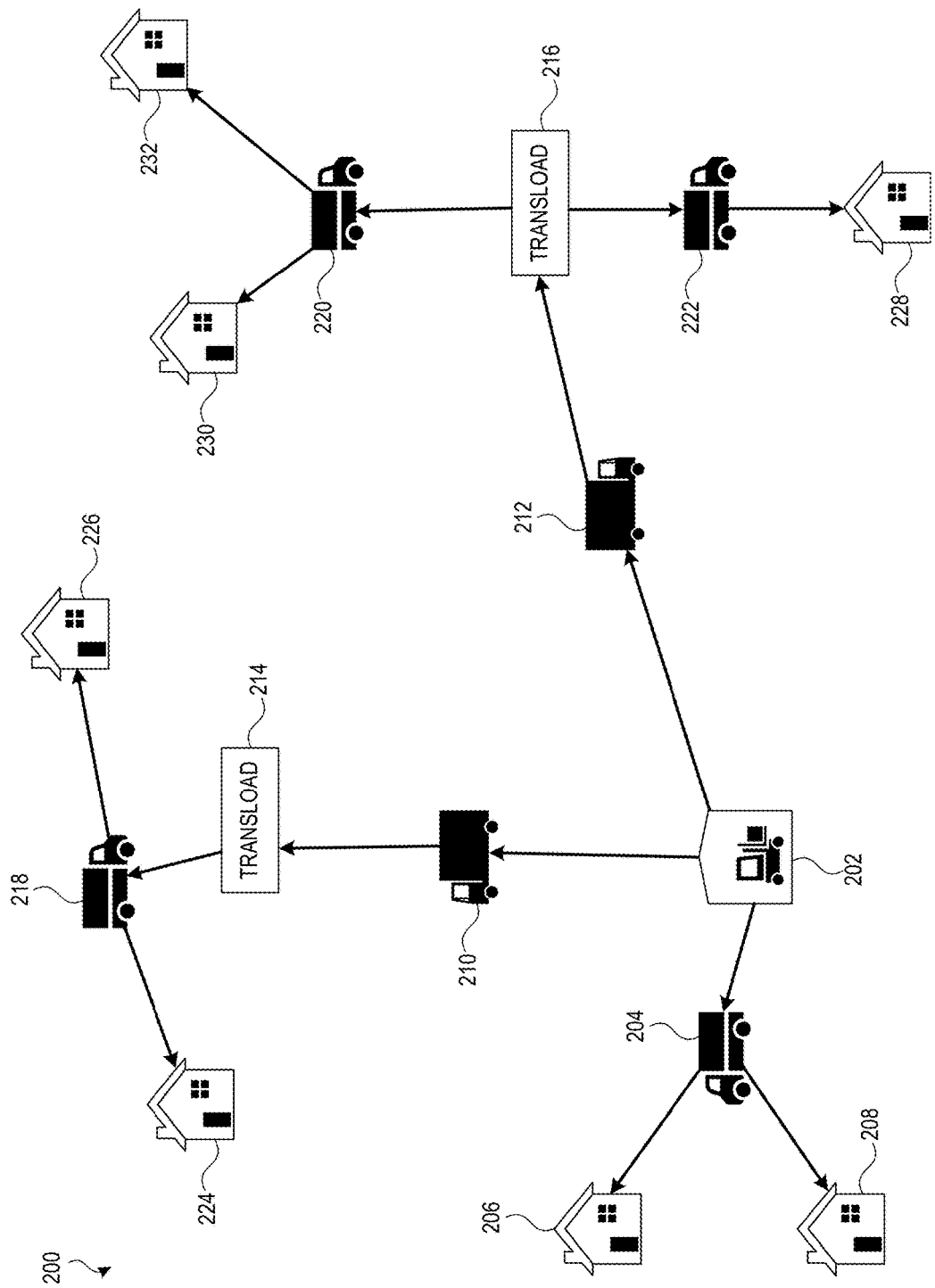
FIG. 2 illustrates an example system for fulfilling deliveries of an enterprise from a warehouse to a customer utilizing a plurality of transload locations, according to an example.

FIG. 2 illustrates an example system for fulfilling deliveries of an enterprise from a warehouse to a customer utilizing a plurality of Transload locations, according to an example. As will be described in more detail below, the system 200 may include warehouse 202 (for example, warehouse 106 of FIG. 1), Transload points 214, 216 (for example, transload point 118 of FIG. 1), large container trucks 210, 212 (for example, large container trucks 104, 116 of FIG. 1), delivery vehicles 204, 218, 220, 222 (for example, last-mile delivery vehicles 108, 120 or national courier vehicle 112 of FIG. 1), and customer delivery locations 206, 208, 224, 226, 228, 230, 232 (for example, customer delivery locations 110, 114, 122 of FIG. 1). In some examples, system 200 is included within a geographical area served by warehouse 202 of an enterprise. In further examples, the warehouse 202 may represent a consolidation point downstream of retail locations within a retail enterprise.

In some examples, items may be picked up from warehouse 202 by delivery vehicle 204, which may deliver the items directly to customer delivery locations 206, 208. In some examples, customer delivery locations 206, 208 may correspond to a lower shipping cost and/or a shorter distance directly from warehouse 202 than customer delivery locations 224, 226, 228, 230, 232. In some examples, a cost may be associated with a distance or throughput capacity.

In some examples, items may be picked up from warehouse 202 by large container trucks 210, 212 and transported to Transload points 214, 216. In some examples, items may be picked up by delivery vehicle 218 from Transload point 214 for delivery to customer delivery locations 224, 226. In some examples, customer delivery locations 224, 226 may correspond to a lower shipping cost and/or a shorter distance from Transload point 214 than directly from warehouse 202 or from Transload point 216. In some examples, a cost may be associated with a distance or throughput capacity.

In some examples, items may be picked up by delivery vehicle 220 from Transload point 216 for delivery to customer delivery locations 230, 232. In some examples, customer delivery locations 230, 232 may correspond to a lower shipping cost and/or a shorter distance from Transload point 216 than directly from warehouse 202 or from Transload point 214. In some examples, items may be picked up by delivery vehicle 222 from Transload point 216 for delivery to customer delivery location 228. In some examples, customer delivery location 228 may correspond to a lower shipping cost and/or a shorter distance from Transload point 216 than directly from warehouse 202 or from Transload point 214. In some examples, a cost may be associated with a distance or throughput capacity.

Figure 3:
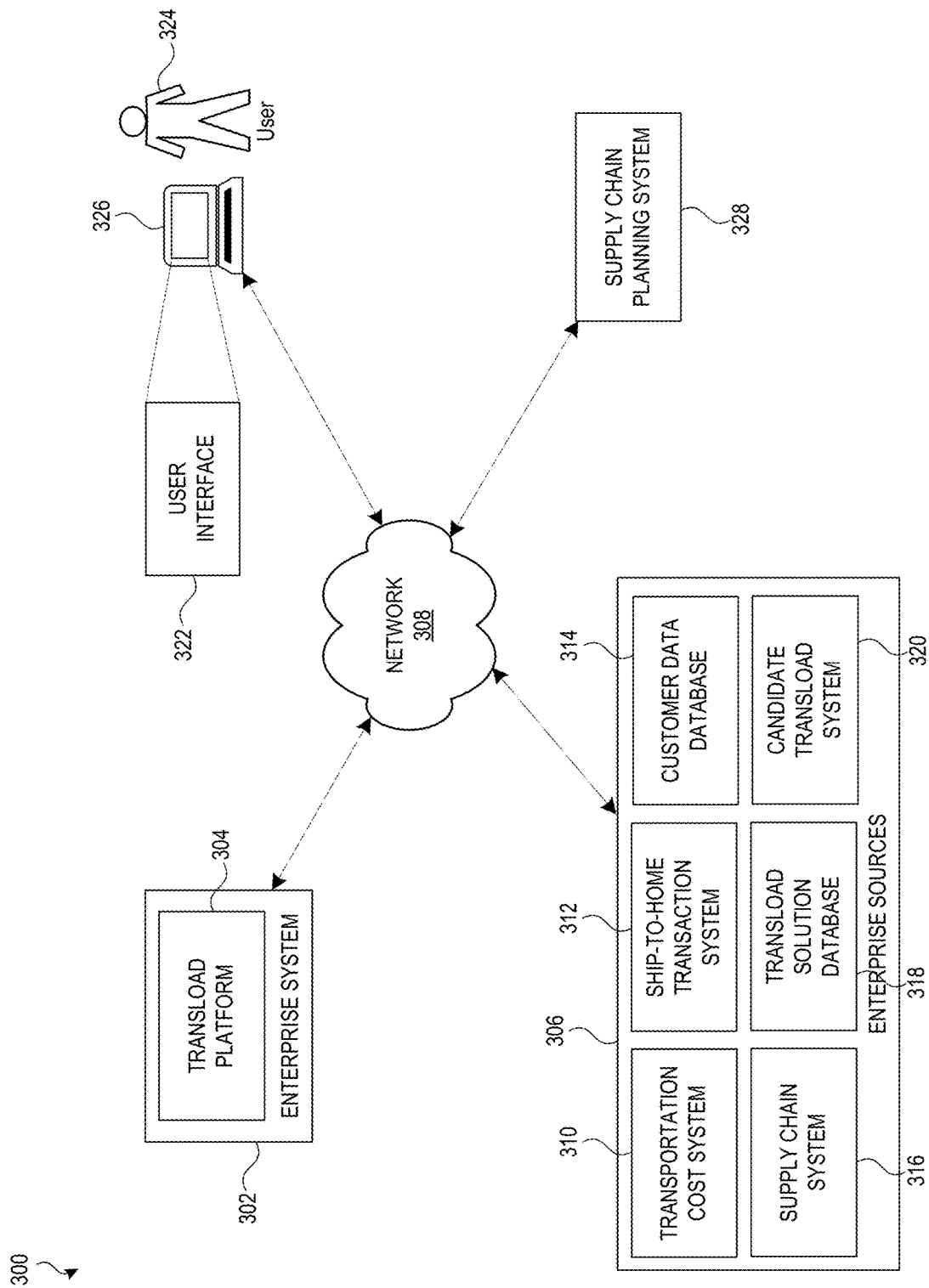
FIG. 3 illustrates an example system for facilitating a determination of transload locations for fulfilling deliveries, according to an example.

FIG. 3 illustrates an example system for facilitating a determination of transload locations for fulfilling deliveries, according to an example. As will be described in more detail below, the system 300 may include enterprise system 302, transload platform 304, network 308, enterprise sources 306 (which may include transportation cost system 310, ship-to-home transaction system 312, customer data database 314, supply chain system 316, Transload solution database 318, and candidate Transload system 320), user interface 322, user 324, device 326, and supply chain planning system 328.

In an example, Transload platform 304, which may be included in enterprise system 302, may receive input data from (or provide output data to) enterprise sources 306 (which may include transportation cost system 310, ship-to-home transaction system 312, customer data database 314, supply chain system 316, Transload solution database 318, and candidate transload system 320). Enterprise system 302 (including transload platform 304) may include sub-processors, tools, and services, to aid in the intake, processing, analysis, and display of the data and inputs, as will be discussed herein. In some examples, Transload platform 304 may be a mathematical model. In some examples, transload platform 304 may be a binary integer program (general MILP).

The various input (or output) data may be communicated to Transload platform 304 via network 308.

In some examples, as described herein, network 308 may include a computer network, an enterprise intranet, the Internet, a LAN, a Wide Area Network (WAN), wireless transmission mediums, wired transmission mediums, other networks, and combinations thereof. Although network 308 is shown as a single network in FIG. 3, this is shown as an example and the various communications described herein may occur over the same network or a number of different networks.

In some examples, one or all of transportation cost system 310, ship-to-home transaction system 312, customer data database 314, supply chain system 316, Transload solution database 318, and candidate Transload system 320 may be within enterprise sources 306; in some examples one or all of them may be external to enterprise sources 306. In some examples, database or data storage as used herein may refer to one or more various databases internal to the enterprise or external to the enterprise, which may be virtual (e.g. cloud-based) in some examples; in some examples, they may network or drive-based. In some examples, systems as described herein (for example, enterprise system 302, transportation cost system 310, ship-to-home transaction system 312, supply chain system 316, or candidate transload system 320) may include one or more databases or data storage structures.

In some examples, transportation cost system 310 may include, send, and/or receive data such as transportation costs of different items (which may have different requirements and characteristics, such as weight size, refrigeration requirements, and many others), to different locations (for example, on a per-mile or per-kilometer basis), for different shipping methods (for example, for large container trucks, last-mile delivery services, or national carriers). In some examples, transportation cost system 310 may include, send, and/or receive data associated with costs associated with Transload points, which may include capital and/or operational costs, and which may be fixed, periodical, or lump costs in some examples.

In some examples, ship-to-home transaction system 312 may include, send, and/or receive data relating to item order transactions from customers. In some examples, this ship-to-home transaction data may be historical data or projected data relating items of an orders which were or are predicted to be delivered to a customer delivery location (for example, delivered to a customer home, and in some examples, same-day delivery to the customer's home).

In some examples, customer data database 314 may include, send, and/or receive data regarding customers, such as addresses and postal codes of delivery locations for customers, customer preferences, customer orders, or customer payment and personal information.

In some examples, supply chain system 316 may include, send, and/or receive data such as warehouse locations, warehouse types, warehouse throughput and/or storage capacity, warehouse defined geographical areas, courier/carrier types and their associated vehicles, vehicle capacities, maps, roads, route information, distance data, or other supply chain information.

In some examples, candidate Transload system 320 may include, send, and/or receive data associated with candidate transload points, which may be received by transload platform 304 as an input. In some examples, data associated with candidate Transload points may include addresses and postal codes (e.g. ZIP codes), category of transload point (for example, enterprise store, enterprise store parking lot area, or standalone building), or capacity of transload points, geographic area the transload point location resides in (or which warehouse(s) the transload point may be associated with), among other information.

In some examples, transload solution database 318 may include, send, and/or receive data associated with the Transload platform 304. In some examples, Transload platform 304 may output solution data to transload solution database 318, including data regarding the clustering of customer delivery locations, which customer delivery locations are associated with which warehouses or transload point locations, the number of transload points selected for a geographical area served by the warehouse, shipping cost calculations, or the number of customer delivery locations which are not suitable for ship-to-home or same-day ship-to-home item delivery.

In some examples, the steps and results of Transload location determination, customer delivery location clustering, and other processes performed by transload platform 304 may be included in outputs generated for display and/or user interaction on user interface 322, which may be displayed to user 324 on device 326. In some examples, as described herein, the device 326 may be a desktop computer, a laptop computer, a tablet, a cell phone, a smart TV, a smart wearable device, or other appropriate electronic device which is capable of displaying the user interface 322. In an example, user 324 is an employee, operator, manager, or other agent of the enterprise. In an example, user interface 322 is a web application. In other examples, user interface 322 is a device application. In some examples, user interface 322 allows user 324 to interact with displayed tables, graphs, lists, or other appropriate display means based on user 324's needs and preferences (for example, selecting, filtering, sorting, customizing views and charts, or toggling different options on and off).

In some examples, the steps and results of Transload location determination, customer delivery location clustering, and other processes performed by Transload platform 304 may be included in outputs sent to supply chain planning system 328. In some examples, supply chain planning system 328 may implement the solutions generated by Transload platform 304 within the enterprise supply chain.

FIG. 4 illustrates example categories of Transload locations, according to an example. In an example, a transload point may be of one of several categories. Categories may include an area within an enterprise store parking lot, a standalone building, a space within or adjacent to an enterprise store, or other appropriate type.

Example category 402 illustrates a transload point which is set up in parking lot 410 of an enterprise store 408. In an example, parking lot 410 has adequate parking spaces to accommodate in-store shopping customers and employees of store 408, even after space is removed to create an area for the transload location. A transload point in example category 402 may be located in a portion of parking lot 410 where it has clear access for large delivery trucks and (last-mile) delivery vehicles to enter and exit, and where it does not impede the flow of vehicle or pedestrian traffic for store 408.

A Transload point in example category 402 may include parking bays 414 (parking spaces or a designated area) for large container trucks to deliver items from a warehouse, and for (last-mile) delivery vehicles to pick up items to deliver them to customer delivery locations. A Transload point in example category 402 may include storage and redistribution areas 412 (for example, separate or combined), where items may be temporarily stored once received and may be loaded onto the appropriate delivery vehicles.

In an example, the Transload point of example category 402 may have associated with it various capital costs, including operational and maintenance costs, capital costs, personnel costs, and others. In an example, the Transload point of example category 402 may have a designated capacity of items it may process in a given timeframe, given the size and capability of the transload point (which, in some examples, may be limited so as not to interfere with the profitability of store 408).

In an example, an outdoor redistribution area at an enterprise store such as store 408 may be utilized for staging truckloads of items which my then be passed to last-mile delivery vehicles. In some examples, this may have an intermediate associated cost due to securing an outdoor area, reserving existing space at the store, and some capital and personnel costs.

Example category 404 illustrates a Transload point which is set up as a standalone sort center, which may be a standalone building. In an example, Transload point 416 may include storage and redistribution areas (for example, separate or combined), where items may be temporarily stored once received and may be picked up, e.g., loaded, onto the appropriate delivery vehicles. In an example, Transload point 416 may include parking spaces or parking bays for large container trucks to deliver items from a warehouse, and for (last-mile) delivery vehicles to pick up items to deliver them to customer delivery locations.

In an example, Transload point 416 may have associated with it various costs, including building mortgage or rent payments, taxes, operational and maintenance costs, capital costs, personnel costs, and others. In an example, the transload point 416 may have a designated capacity of items it may process in a given timeframe, given the size and capability of the transload point (which, in some examples, may be limited only by the storage and handling capacity of the standalone building, which may be chosen by the enterprise to be as large as necessary to fill a specific need).

In an example, items for delivery may be sorted at a warehouse or other standalone facility into route carts which are received at Transload point 416 and staged the facility, until a last-mile delivery vehicle arrives for pickup. In some examples, this may correspond to a lowest-volume option that requires the lowest cost to implement at a given location, and so may result in selection of more Transload points such as Transload point 416. In some examples, this may correspond to a higher-volume option and may require a large cost to implement at a location, if building costs and capital costs are higher, and so may result in selection of fewer Transload points such as Transload point 416.

Example category 406 illustrates a Transload point 420 which makes use of a space within or adjacent to an enterprise store 418. In an example, Transload point 420 may be located within the store 418 or adjacent to the store 418 and may include storage and redistribution or pickup areas (for example, separate or combined), where items may be temporarily stored once received and may be positioned for loading onto the appropriate delivery vehicles. In an example, Transload point 420 may be located in an area of store 418 which is underutilized (for example, excess storage space) so that it does not impede the profitability of store 418. In an example, Transload point 420 may be located in an area adjacent to store 418 which is underutilized or not utilized (or which may be converted from another utilization). In an example, store 418 has parking spaces for its customers and employees. In an example, store 418 has parking spaces and/or loading bays for pick-up and/or delivery vehicles. In an example, Transload point 420 may make use of parking spaces and/or loading bays of store 418, and in some examples it may use those parking/loading resources which may be located in a portion of the parking lot or store 418 where there is clear access for large delivery trucks and (last-mile) delivery vehicles to enter and exit, and where the transload operations do not impede the flow of vehicle or pedestrian traffic for store 418.

In an example, Transload point 420 may have associated with it various capital costs, including operational and maintenance costs, capital costs, personnel costs, and others. In an example, Transload point 420 may have a designated capacity of items it may process in a given timeframe, given the size and capability of the Transload point (which, in some examples, may be limited so as not to interfere with the profitability of store 418, which may include size constraints inside of store 418).

In an example, some enterprise stores may have underutilized space (internal to or adjacent to the store) which may be convertible to operate as a Transload point. In some examples, it may not be a common occurrence for stores to have underutilized space. In some examples, if a store such as store 418 does have underutilized space, there may be build-out costs associated with outfitting the space to be suitable for use as a transload point such as Transload point 420.

In some examples, the underutilized space of an enterprise warehouse (including sortation centers or distribution centers) may be utilized as a transload point similar to the space of store 418 being used as Transload point 420.

Figure 4A:
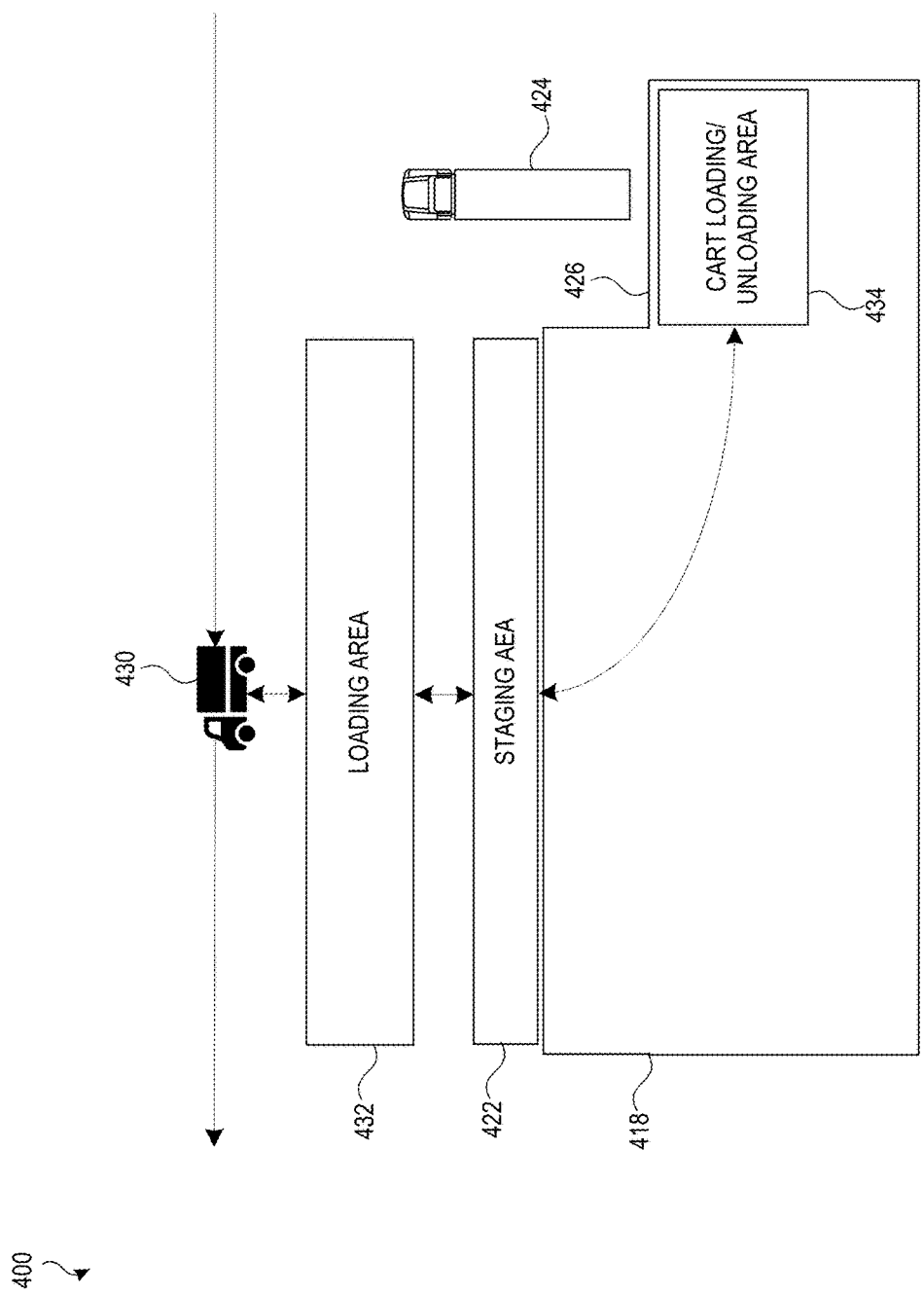
FIG. 4A illustrates an example implementation of a transload location, according to an example.

FIG. 4A illustrates an example implementation of a transload location, according to an example. In an example, a space adjacent to store 418 is utilized as a transload location (for example, such as Transload point 420, see FIG. 4). In an example, the space adjacent to the store may be utilized as a staging area 422 for staging items for delivery. In some examples, delivery and pick-up of items from staging area 422 may occur at times outside of the normal operating hours of store 418; in those examples, having staging area 422 adjacent to (outside of) store 418 instead of inside of store 418 may be beneficial as it may provide access to items outside of store hours. In some examples, having staging area 422 adjacent to store 418 may be beneficial as it may keep the inventory/storage of items/carts intended for last-mile delivery to customers separate from other inventory for store 418 (for example, from retail inventory intended for sale in store 418) and may not lessen the inventory volume capacity of store 418. In some examples, staging area 422 may be covered by a roof or canopy for protection from the elements, and in some examples it may be completely or partially surrounded by walls, barriers, and/or fencing to increase security.

In an example, a delivery vehicle, such as a large container truck 424, may arrive at store 418 with items for delivery to customer delivery locations. In some examples, the items arrive pre-sorted into groups of items. In some examples, the items arrive pre-sorted onto carts. Truck 424 may pull into a loading bay of a receiving dock 426 of store 418 so that the items/carts may be unloaded. In some examples, the items/carts may be unloaded into a cart loading/unloading area 434. In some examples, cart loading/unloading area 434 is oriented so that items/carts destined for last-mile delivery vehicles (such as delivery vehicle 430) are kept separate from other items (for example, items intended for retail sale at store 418). Unloaded items/carts may be brought through the store 418 to staging area 422.

Staging area 422 may be subdivided into one or more areas. Staging area 422 may have storage locations for items/carts, such as shelves, bins, or lockers. In some examples, storage such as lockers may be of different types, in order accommodate different types of items (for example, cooled, ambient, extra-large, ventilated, etc.). In an example, lockers or other storage locations may be securable or lockable, to keep items secure until they are removed for loading into a delivery vehicle. This security may be beneficial in examples where staging area 422 is located adjacent to store 418 (e.g. not behind lockable doors of store 418). In an example, items/carts are brought into staging area 422 and loaded into a locker or other storage location. In some examples, an item/cart may be loaded into a designated locker or other storage location. In some examples, an item may be loaded randomly into an available locker or available other storage location.

In some examples, movement and storage of items/carts is tracked or guided by a system such as a program or application. In an example, an item or cart may have on it a code (for example, a bar code, QR code, or other suitable scannable code) which may be scanned (for example by a handheld scanning device, cell phone, or other suitable scanning device). Personnel unloading the item/cart from large container truck 424 may scan the code on the item/cart and may scan a similar code on a locker or other storage location into which the item/cart is stored. This may store electronic information that the particular item/cart is located in a particular locker or other storage location and may link this information with other information relating to the item, such as delivery schedule, delivery location, delivery route, target delivery vehicles, contents, customer information, and other relevant information.

In some examples, a package loading zone 432 (e.g. parking area or drive-in lane) may be designated for delivery vehicles such as delivery vehicle 430 (for example, a last mile delivery vehicle). In an example, delivery vehicle 430 may arrive in package loading zone 432. In an example, delivery vehicles may park in any of an array of available or open parking spaces within package loading zone 432. In some examples, the driver of delivery vehicle 430 may alert personnel of store 418 that they have arrived, and may alert personnel of a particular location (e.g. a particular number, name, letter, or other label assigned to a particular parking spot). The personnel may then retrieve items/carts which are to be loaded onto delivery vehicle 430 and delivered to customer delivery locations along its route from their lockers or other storage locations. Upon removing an item/cart from the locker or other storage location, the personnel may scan the code(s) on the item/cart and/or the locker or other storage location. This may edit the stored information associated with the item/cart (that it is no longer in the locker or other storage location) and/or locker or other storage location (that it is open to receive another item/cart) and may inform the personnel which delivery vehicle 430 and vehicle location to take the item/cart to for loading.

Upon loading of the item(s) into delivery vehicle 430, stored item information may be updated to reflect that it is loaded onto delivery vehicle 430 and is out for delivery. Empty carts (after the pre-sorted items they contained have been loaded into delivery vehicle 430) may be loaded back onto outgoing container trucks for return delivery to warehouses/mixing centers/sorting centers, where they may be again loaded with pre-sorted items and cycled back to the Transload point.

In some examples, timing or scheduling of large container truck 424 and/or delivery vehicle 430 may be adjusted or coordinated based on multiple factors, including required delivery time of items to customer delivery locations, scheduled delivery of inventory items by other trucks to store 418, times of high customer or personnel traffic, times of high volume of customer pick-up orders (for example, curb-side or drive-up orders), or other relevant factors.

The example illustrated in FIG. 4A is shown in the context of space adjacent to store 418 being utilized as a staging area. However, the principles of the example shown in FIG. 4A may also be applicable to other contexts, such as where the staging area is internal to store 418, where the transload location is located in a store parking lot, or where the transload location is not at or near a store (see, for example, example categories 402, 404, and 406 from FIG. 4, described above).

Figure 5:
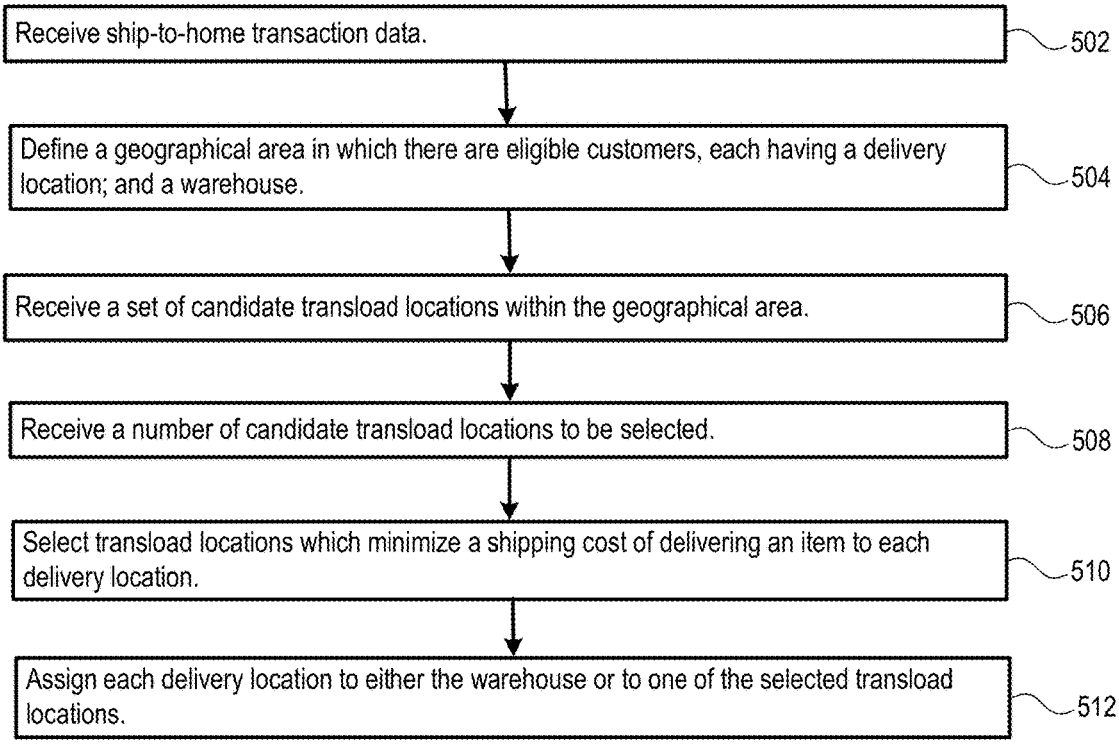
FIG. 5 illustrates an example method for facilitating a determination of transload locations for fulfilling deliveries, according to an example.

FIG. 5 illustrates an example method for facilitating a determination of transload locations for fulfilling deliveries, according to an example. The method 500 may be performed by one or more systems of the system 300 shown and described with respect to FIG. 3.

In some examples, at step 502, ship-to-home transaction data may be received. In some examples, the ship-to-home transaction data may be associated with a time period. In some examples, the ship-to-home transaction data may include data regarding orders for delivery of items to be delivered same-day. In some examples, the ship-to-home transaction data may be either historical ship-to-home transaction data or projected ship-to-home transaction data. In some examples, additional data inputs may be received as well, including customer locations and granularity, costs, distances, constraints, or other relevant inputs.

In some examples, at step 504, a geographical area may be defined in which there are candidate customers, each customer having a delivery location. In some examples, the geographical area may also include a warehouse.

In some examples, at step 506, a set of candidate transload locations within the geographical area may be received. In some examples, the candidate Transload locations may be locations at which Transload points may be located, and the transload points may be one or multiple of different categories as described earlier in FIG. 1-4.

In some examples, at step 508, a number of candidate Transload locations to be selected may be received. For example, it may be specified that one, two, three, four, five, or a higher number of Transload locations may be selected. In some examples, the number of candidate Transload locations may include a dummy node or dummy cluster, which will not be associated with a physical Transload location.

In some examples, at step 510, Transload locations may be selected (from among the set of candidate Transload locations) which minimize a shipping cost of delivering an item to each delivery location. In some examples, Transload locations may be selected via the method outlined in FIG. 6, below. In some examples, minimizing the shipping cost may be achieved by grouping delivery locations into clusters, each of the clusters being served by the warehouse or one of the number of Transload locations. In some examples, Transload locations may be selected based partially on a space or storage volume requirement, to ensure the Transload location can support the required item storage space and vehicle lane/parking space. In an example, a potential Transload location which may have a desirable location and be associated with a desirable shipping cost, may not be a suitable Transload location if its storage volume is not adequate to meet a pre-determined storage volume requirement to satisfy all necessary item deliveries.

In some examples, at step 512, each delivery location may be assigned to either the warehouse or to one of the selected Transload locations. In some examples, regions containing delivery locations may be assigned to either the warehouse or to one of the selected Transload locations. In some examples, regions may be defined by postal code. In some examples, where delivery locations are grouped into clusters for a selected group of candidate delivery source locations, delivery locations may be assigned to either the warehouse or to one of the Transload locations within a selected candidate group, based at least in part on the cluster which each delivery location was grouped into.

In some examples, a geographical area may include more than one warehouse. In some examples, when there is more than one warehouse, the steps of method 500 (or of method 600 below) may be performed with one of the multiple warehouses. In some examples, when there is more than one warehouse, the steps of method 500 (or of method 600 below) may be performed utilizing all of or a subset of the warehouses in the geographical area, in addition to or in lieu of one or more of the selected Transload locations.

In some examples, a user interface may be generated which includes the assigned regions and/or the assigned delivery locations. In some examples, a user interface may be generated which may include clusters which delivery locations have been grouped into, and which may include a selected candidate group.

In some examples, an output solution including the assigned regions and/or delivery locations may be stored to a Transload solution database, and in some examples the Transload solution database may be accessible to an enterprise supply chain planning system (for example, refer to FIG. 1). In some examples, an output solution stored to the Transload solution database may include a definition of clusters that delivery locations have been grouped into. In some examples, outputs may include descriptions and data associated with selected Transload locations and/or shipping routes to the selected Transload locations from the warehouse and shipping routes from the selected Transload locations to efficiently deliver items to each delivery location.

Figure 6:
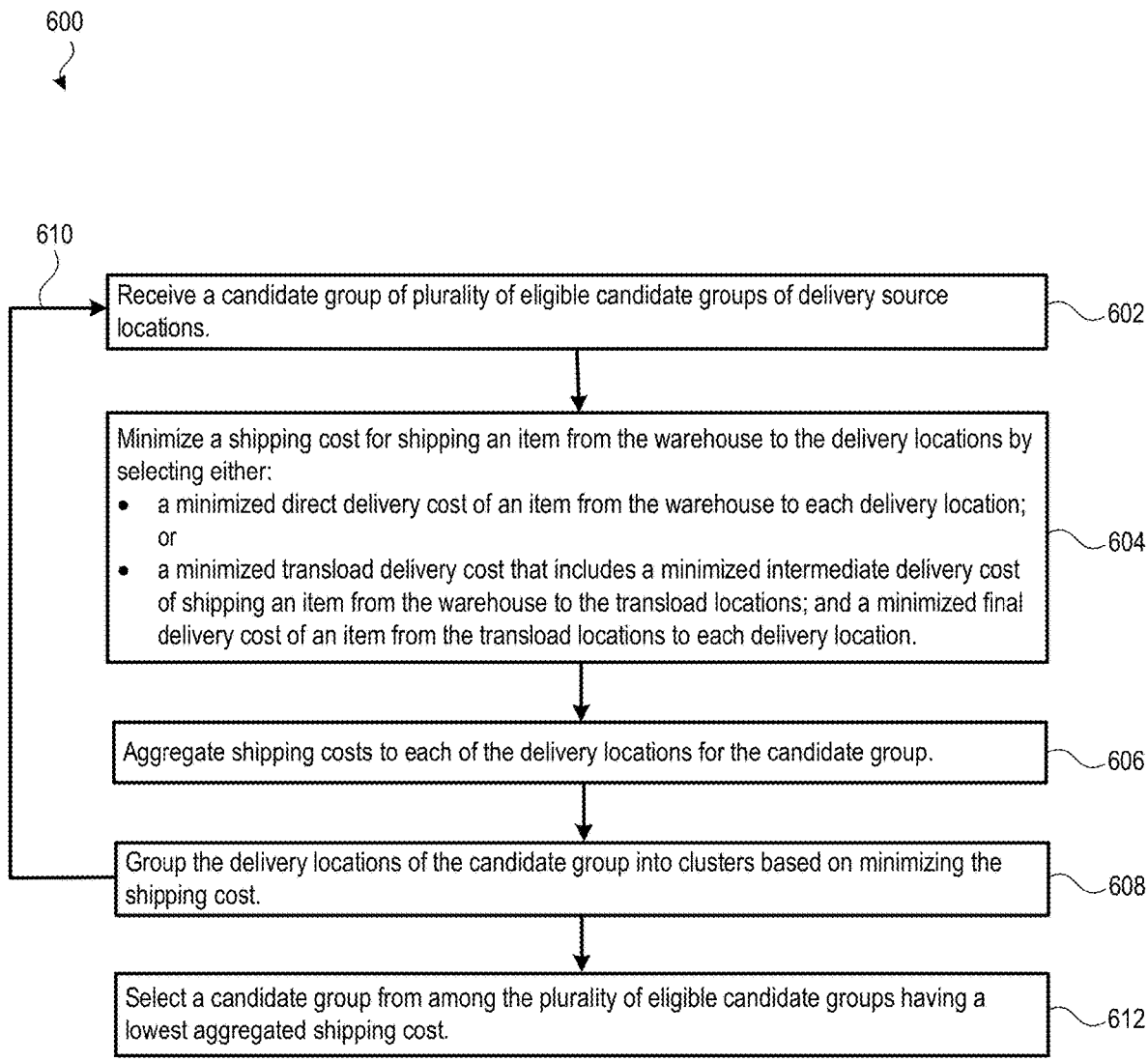
FIG. 6 illustrates an example method for selecting transload locations for fulfilling deliveries based on minimizing a shipping cost, according to an example.

FIG. 6 illustrates an example method for selecting Transload locations for fulfilling deliveries based on minimizing a shipping cost, according to an example. The method 600 may be performed by one or more systems of the system 300 shown and described with respect to FIG. 3. In some examples, the method 600 may be performed in conjunction with or as a part of method 500, above.

In some examples, at step 602, a candidate group may be received, where the candidate group is one of multiple (a plurality of) eligible candidate groups of delivery source locations. In some examples, the eligible candidate groups of delivery source locations each represent a different combination of candidate Transload locations and a warehouse location. In some examples, the candidate Transload locations and the warehouse location are within a same geographical area.

In some examples, at step 604, a shipping cost for shipping an item from a warehouse to a delivery location may be minimized by selecting either: a minimized direct delivery cost of an item from the warehouse to each delivery location; or a minimized Transload delivery cost that may include at least: a minimized intermediate delivery cost of shipping an item from the warehouse to the Transload locations; and a minimized final delivery cost of an item from the Transload locations to each delivery location.

In some examples, the direct delivery cost may include distance traveled, time duration of travel, delivery vehicle operational costs, costs associated with shipment vehicle capacity, personnel costs, or other relevant costs. In some examples, the transload delivery cost may include distance traveled, time duration of travel, delivery vehicle operational costs, fixed Transload operational costs, costs associated with shipment vehicle capacity, personnel costs, capital costs, costs associated with Transload location throughput capacity, and other relevant costs. In some examples, direct delivery costs and/or transload delivery costs may take into account constraints (for example, throughput constraints, vehicle capacity constraints, personnel constraints, road travel limitations and laws, and other relevant constraints).

In some examples, at step 606, shipping costs may be aggregated (at least in part from either or both of the minimized direct delivery cost or the minimized transload delivery cost) to each of the delivery locations for the candidate group.

In some examples, at step 608, the delivery locations of the candidate group may be grouped into clusters based on minimizing the shipping cost. In some examples, each cluster assigns each of the candidate customers to a delivery source location of the candidate group, by minimizing the shipping cost. In some examples, each cluster corresponds to a Transload location or the warehouse and indicates that delivery locations assigned to that cluster will have item deliveries served by that transload location or the warehouse.

In some examples, steps 602 through 608 may be repeated (the method may return 610 to step 602) until cost is minimized for each candidate group.

In some examples, at step 612, a candidate group may be selected (from among the eligible candidate groups) which may have a lowest aggregated shipping cost.

In some examples, at step 608, the clusters may include a dummy cluster. In some examples, the dummy cluster is not associated with a Transload point or the warehouse but instead may be associated with a fixed economic threshold cost. In some examples, the fixed economic threshold may indicate that, for a delivery location whose shipping costs exceeds that threshold, ship-to-home delivery is not economical for the enterprise (or, in some examples, that same-day ship-to-home delivery is not economical for the enterprise). In some examples, at step 612, delivery locations may be grouped into the dummy cluster based on a determination that the shipping cost associated with those delivery locations from any of the non-"dummy" delivery locations exceeds that fixed economic threshold. In some examples, the enterprise will not provide ship-to-home (or, in some examples, same-day ship-to-home) services to delivery locations which are assigned to the dummy cluster. In some examples, inclusion of a dummy cluster may provide the enterprise an efficient, set cost method of determining economical delivery areas, instead of the enterprise needing to rely on more inefficient manually iterative methods to determine delivery locations with shipping costs within a threshold value.

Figure 7:
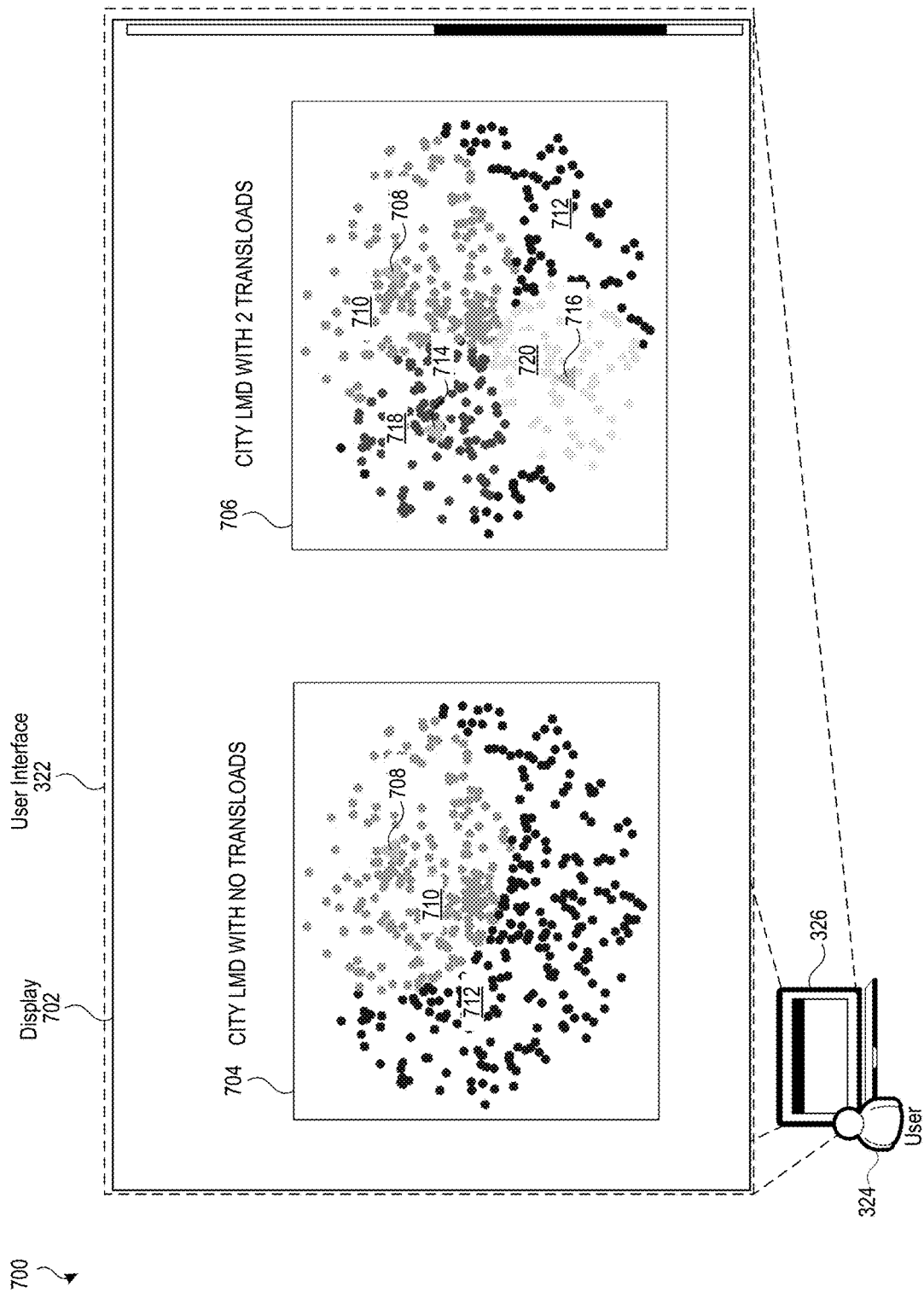
FIG. 7 illustrates an example display depicting a comparison of potential customer delivery points with no transload locations with potential customer delivery points with two transload locations, according to an example.

FIG. 7 illustrates an example display depicting a comparison of potential customer delivery points with no Transload locations with potential customer delivery points with two Transload locations, according to an example. The system 700 may include user interface 322, which may comprise display 702, and may be displayed via device 326 to user 324.

In some examples, display 702 includes images depicting customer delivery locations which are able to be served by last-mile delivery (herein, last-mile delivery may mean last-mile delivery or same-day last-mile delivery, depending on the needs of the enterprise, in some examples). First image 704 depicts a central warehouse 708 in a city geographical area. Dots in first image 704 represent customer delivery locations in the geographical area which may be potentially eligible for last-mile delivery. Dots of shade 710 correspond to delivery locations which, in this example, are eligible for last-mile delivery of items from warehouse 708. Dots of shade 712 correspond to delivery locations which are not eligible for last-mile delivery of items from warehouse 708 (which may not be eligible due to a high shipping cost, in some examples).

Second image 706 depicts warehouse 708 in the same city geographical area, as well as Transload points 714, 716. Dots in second image 706 again represent customer delivery locations in the geographical area which may be potentially eligible for last-mile delivery. Dots of shade 710 again correspond to delivery locations which, in this example, are eligible for last-mile delivery of items from warehouse 708. Dots of shade 718 correspond to delivery locations which, in this example, are eligible for last-mile delivery of items from Transload point 714. Dots of shade 720 correspond to delivery locations which, in this example, are eligible for last-mile delivery of items from Transload point 716. Again, dots of shade 712 correspond to delivery locations which are not eligible for last-mile delivery of items from warehouse 708. In some examples, the locations of transload points 714, 716 and their associated customer delivery location clusters may be determined by a method such as method 500 and/or method 600 above.

In some examples, as is the case in display 702, delivery locations associated with a particular Transload point or warehouse may be located in a cluster of a shorter distance from the Transload point or warehouse.

In the example shown in display 702, the scenario with two Transload points 714, 716 as depicted in second image 706 results in more customer delivery locations being eligible for last-mile delivery (dots of shade 710, 718, 720) and fewer customer delivery locations being ineligible for last-mile delivery (dots of shade 712) than the scenario with no Transload points as depicted in first image 704.

In some examples, display 702 may enable user 324 to visualize and make business decisions regarding implementing Transload points into the enterprise supply chain to increase the speed and efficiency of (and, in some examples, reduce the cost of) last-mile delivery, and to increase customer satisfaction.

Figure 8:
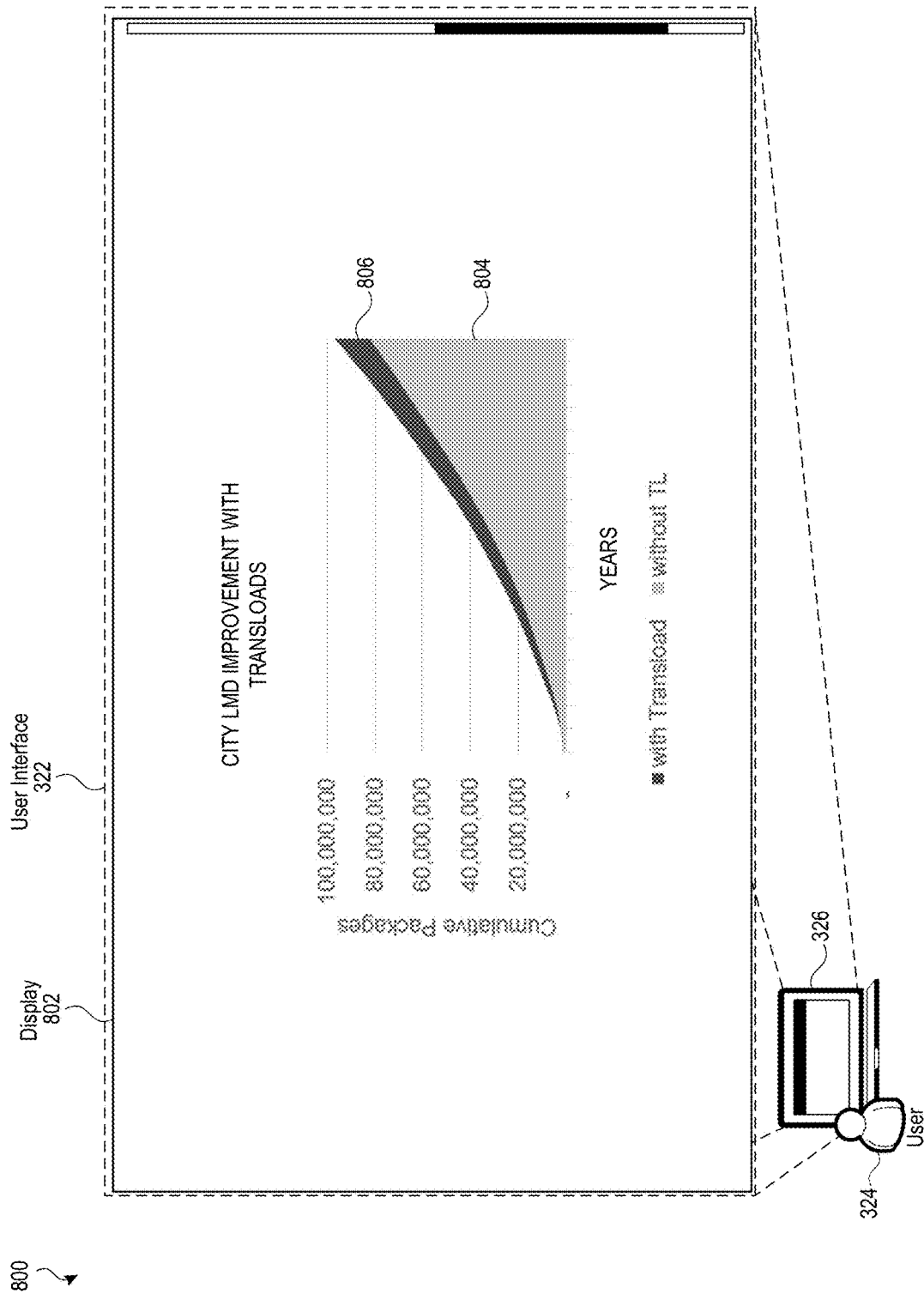
FIG. 8 illustrates an example display depicting a graph demonstrating the difference between cumulative package capacity with no transload locations with cumulative package capacity with transload locations, according to an example.

FIG. 8 illustrates an example display depicting a graph demonstrating the difference between cumulative package capacity with no Transload locations with cumulative package capacity with Transload locations, according to an example. The system 800 may include user interface 322, which may comprise display 802, and may be displayed via device 326 to user 324.

In some examples, display 802 includes a table, graph, or chart a number of packages of one or more items which it may be possible to deliver to customer delivery locations over a timeframe. Area 1 804 of the example graph depicted in display 802 represents a number of item packages which it may be possible to deliver to customer delivery locations in a scenario in which there is no transload point in a geographical area (for example, the scenario depicted in first image 704 of FIG. 7). Area 2 806 of the example graph depicted in display 802 represents an additional number of item packages (in addition to the number represented by Area 1 804) which it may be possible to deliver to customer delivery locations in a scenario in which there are a defined number of Transload points in a geographical area (for example, the scenario depicted in second image 706 of FIG. 7 in which there are two Transload points).

In some examples, the number of item packages which it may be possible to deliver may generally increase over time. In some examples, the number of item packages which may be delivered at any point in time may be increased by adding Transload points to the supply chain in the geographical area. In some examples, the number of item packages which it may be possible to deliver through the added Transload points may also increase over time.

In some examples, display 802 may enable user 324 to calculate costs and throughputs, and make business decisions regarding implementing Transload points into the enterprise supply chain to increase the speed and efficiency of (and, in some examples, reduce the cost of) last-mile delivery, and to increase customer satisfaction.

Figure 9:
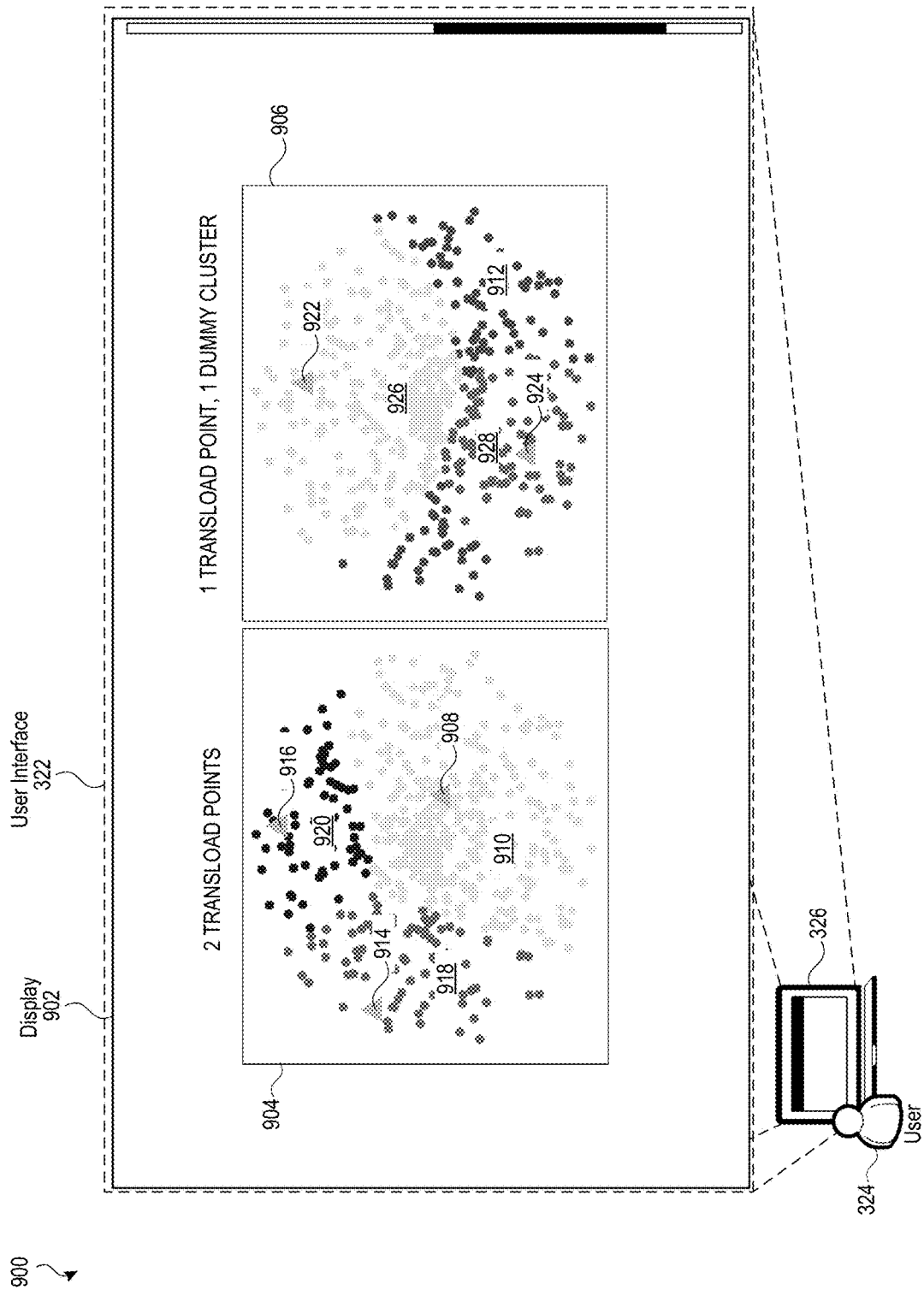
FIG. 9 illustrates an example display depicting a comparison of potential customer delivery points with two transload locations with potential customer delivery points with one transload location and a dummy cluster, according to an example.

FIG. 9 illustrates an example display depicting a comparison of potential customer delivery points with two Transload locations with potential customer delivery points with one transload location and a dummy cluster, according to an example. The system 900 may include user interface 324, which may comprise display 902, and may be displayed via device 326 to user 324.

In some examples, display 902 includes images depicting scenarios in which different transload point strategies are utilized. First image 904 depicts a scenario in which a warehouse 908 and two Transload points 914, 916 are utilized to facilitate last-mile delivery of items to customer delivery locations. In some examples, dots of shade 910 represent customer delivery locations which are eligible to be served by warehouse 908. In some examples, dots of shade 918 represent customer delivery locations which are eligible to be served by Transload point 914. In some examples, dots of shade 920 represent customer delivery locations which are eligible to be served by Transload point 916. In some examples, the locations of Transload points 914, 916 and their associated customer delivery location clusters may be determined by a method such as method 500 and/or method 600 above.

Second image 906 depicts a scenario in which a warehouse 922 and one transload point 924 are utilized to facilitate last-mile delivery of items to customer delivery locations. In some examples, dots of shade 926 represent customer delivery locations which are eligible to be served by warehouse 922. In some examples, dots of shade 928 represent customer delivery locations which are eligible to be served by warehouse 924. Second image 906 also depicts a dummy cluster of customer delivery locations, which are represented by dots of shade 912, and which is not associated with a specific warehouse or Transload point. The customer delivery locations assigned to the dummy cluster may not be eligible for last-mile delivery in the scenario depicted in second image 906.

In the example depicted in display 902, the geographical area contained at least two warehouses 908, 922, and the displayed scenarios used each one where it may have been most efficient as determined by the model of the present disclosure. In some examples, a geographical area may be served by only one warehouse. In some examples, multiple warehouses may be included in a scenario.

In some examples, display 902 may enable user 324 to determine where and when to implement Transload locations, the number of Transload locations, and/or determine which customer delivery points should not be eligible for last-mile delivery services. In some examples, inclusion of a dummy cluster in the analysis, such as that analysis used to generate the output for display 902, may determine for user 324 that although inclusion of a number of Transload locations may increase the total number of customer delivery locations which may be eligible for last-mile delivery, there may be a financial threshold at which some of those customer delivery locations should be treated as ineligible (for example, because they may not be cost effective for the enterprise).

Figure 10:
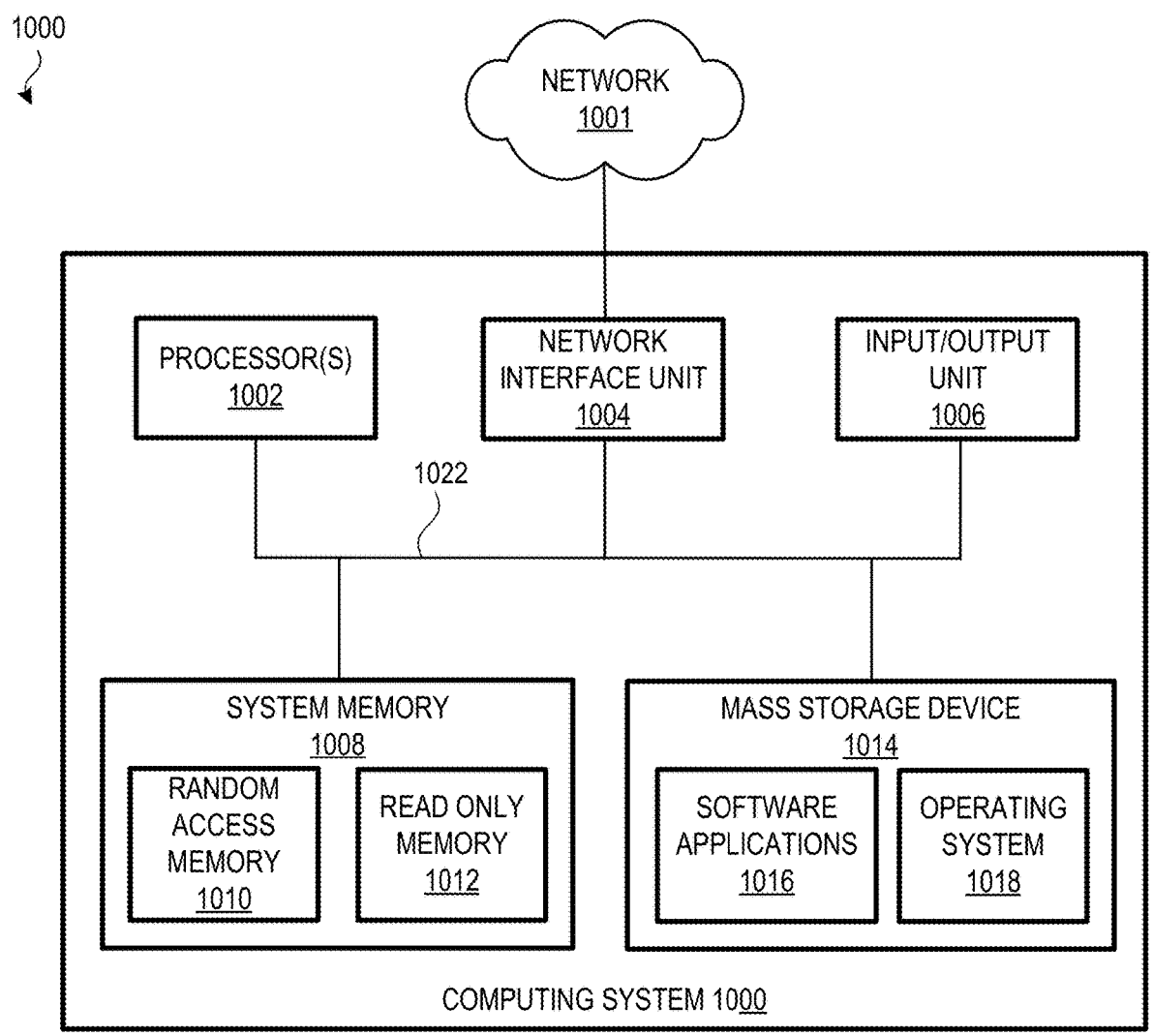
FIG. 10 illustrates an example block diagram of a computing system.

FIG. 10 illustrates an example block diagram of a virtual or physical computing system 1000. One or more aspects of the computing system 1000 can be used to implement the Transload platform 104 or other systems described herein, store instructions described herein, and preform operations described herein.

In the embodiment shown, the computing system 1000 includes one or more processors 1002, a system memory 1008, and a system bus 1022 that couples the system memory 1008 to the one or more processors 1002. The system memory 1008 includes RAM (Random Access Memory) 1010 and ROM (Read-Only Memory) 1012. A basic input/output system that contains the basic routines that help to transfer information between elements within the computing system 1000, such as during startup, is stored in the ROM 1012. The computing system 1000 further includes a mass storage device 1014. The mass storage device 1014 is able to store software instructions and data.

The one or more processors 1002 can be one or more central processing units or other processors.

The mass storage device 1014 is connected to the one or more processors 1002 through a mass storage controller (not shown) connected to the system bus 1022. The mass storage device 1014 and its associated computer-readable data storage media provide non-volatile, non-transitory storage for the computing system 1000. Although the description of computer-readable data storage media contained herein refers to a mass storage device, such as a hard disk or solid-state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 1000.

According to various embodiments of the invention, the computing system 1000 may operate in a networked environment using logical connections to remote network devices through the network 1001. The network 1001 is a computer network, such as an enterprise intranet and/or the Internet. The network 1001 can include a LAN, a Wide Area Network (WAN), the Internet, wireless transmission mediums, wired transmission mediums, other networks, and combinations thereof. The computing system 1000 may connect to the network 1001 through a network interface unit 1004 connected to the system bus 1022. It should be appreciated that the network interface unit 1004 may also be utilized to connect to other types of networks and remote computing systems. The computing system 1000 also includes an input/output controller 1006 for receiving and processing input from a number of other devices, including a touch user interface display screen, or another type of input device. Similarly, the input/output controller 1006 may provide output to a touch user interface display screen or other type of output device.

As mentioned briefly above, the mass storage device 1014 and the RAM 1010 of the computing system 1000 can store software instructions and data. The software instructions include an operating system 1018 suitable for controlling the operation of the computing system 1000. The mass storage device 1014 and/or the RAM 1010 also store software instructions, that when executed by the one or more processors 1002, cause one or more of the systems, devices, or components described herein to provide functionality described herein. For example, the mass storage device 1014 and/or the RAM 1010 can store software instructions that, when executed by the one or more processors 1002, cause the computing system 1000 to receive item shipment information and execute modeling and display processes for identifying optimal Transload locations in a selected geographical area.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For example, while certain technologies described herein were primarily described in the context of determining adequate locations for transload facilities, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:
1. A computing system, comprising:
   at least one processor; and
   at least one memory storing computer-executable instructions for determining transload locations for fulfilling ship-to-home deliveries of an enterprise, the computer-executable instructions when executed by the at least one processor causing the computer to:
      receive ship-to-home transaction data associated with a time period;
      define a geographical area in which there are:
         a plurality of candidate customers for ship-to-home deliveries, each of the plurality of candidate customers having a delivery location; and
         a warehouse;
      receive a set of candidate transload locations within the geographical area;
      receive a number of candidate transload locations to be selected from among the set of candidate transload locations;
      select transload locations from among the set of candidate transload locations, wherein the transload locations minimize a shipping cost of delivering an item to the each delivery location, wherein the shipping cost is a minimum aggregated value selected from between:
  a minimized direct delivery cost of the item from the warehouse to each delivery location; and
  a minimized transload delivery cost that includes at least (1) a minimized intermediate delivery cost of shipping the item from the warehouse to the selected transload of the candidate transload locations; and (2) a minimized final delivery cost of the item from the selected transload locations of the set of candidate transload locations to each delivery location;
assign regions within the geographical area to the one of the selected transload locations or to the warehouse, each region containing one or more of the delivery locations;
determine that a subset of delivery locations should not be included within the regions assigned to the selected transload locations or to the warehouse; and
receive, at a transload location of the selected transload locations, an item designated for delivery to a delivery location of the one or more delivery locations, wherein the delivery location is located within a region assigned to the transload location,
  wherein the item comprises a code comprising electronic information relating to the item, and
  wherein the electronic information comprises delivery location and a delivery route from the transload location to the delivery location.

2. The computing system of claim 1, wherein the ship-to-home transaction data is either historical ship-to-home transaction data or projected ship-to-home transaction data.

3. The computing system of claim 1, wherein the geographical area includes a second warehouse, and wherein the regions within the geographical area are assigned to the selected transload locations, to the warehouse, or to the second warehouse.

4. The computing system of claim 1, wherein the direct delivery cost comprises: travel distance data, travel time data, delivery vehicle operational cost data, or shipment vehicle capacity data.

5. The computing system of claim 1, wherein the transload delivery cost comprises: travel distance data, travel time data, delivery vehicle operational cost data, fixed transload operational cost data, shipment vehicle capacity data, or transload location capacity data.

6. The computing system of claim 1, further comprising instructions to generate a user interface comprising the assigned regions.

7. The computing system of claim 1, further comprising instructions to:
generate an output solution comprising the assigned regions; and
store the output solution to a solution database, wherein the solution database is accessible to an enterprise supply chain planning system.

8. A computing system, comprising:
at least one processor; and
at least one memory storing computer-executable instructions for determining transload locations for fulfilling ship-to-home deliveries of an enterprise, the computer-executable instructions when executed by the at least one processor causing the computer to:
receive ship-to-home transaction data associated with a time period;
define a geographical area in which there are:
  a plurality of candidate customers for ship-to-home deliveries, each of the plurality of candidate customers having a delivery location; and
  a warehouse;
receive a set of candidate transload locations within the geographical area;
receive a number of candidate transload locations to be selected from among the set of candidate transload locations;
for each candidate group of delivery source locations of a plurality of eligible candidate groups of delivery source locations, wherein the eligible candidate groups of delivery source locations each represent a different combination of candidate transload locations and the warehouse location:
group the delivery locations of each of the plurality of candidate customers into a plurality of clusters, the plurality of clusters assigning each of the plurality of candidate customers to one of the delivery source locations of the candidate group by minimizing a shipping cost for shipping an item from the warehouse to the delivery location, either directly or via one of the candidate transload locations within the group of delivery locations;
wherein minimizing the shipping cost comprises selecting either:
  a minimized a direct delivery cost of an item from the warehouse to each delivery location; or
  a minimized transload delivery cost that includes at least (1) a minimized intermediate delivery cost of shipping an item from the warehouse to the one of the candidate transload locations; and (2) a minimized final delivery cost of an item from the one of the candidate transload locations to each delivery location;
aggregate shipping costs to each of the delivery locations for the candidate group;
select a candidate group from among the plurality of eligible candidate groups having a lowest aggregated shipping cost to the plurality of candidate customers;
assign each delivery location to the warehouse or to one of the transload locations within the selected candidate group, based on the cluster of the plurality of clusters that the delivery location is grouped into for the selected candidate group;
determine that a subset of delivery locations should not be assigned to the warehouse or to one of the transload locations within the selected candidate group; and
receive, at a transload location of the selected transload locations, an item designated for delivery to a delivery location of the one or more delivery locations,
  wherein the delivery location is located within a region assigned to the transload location,
  wherein the item comprises a code comprising electronic information relating to the item, and
  wherein the electronic information comprises delivery location and a delivery route from the transload location to the delivery location.

9. The computing system of claim 8, further comprising instructions to group one or more delivery locations into a dummy cluster based on a determination that the shipping cost associated with each of the one or more delivery locations exceeds a fixed ship-to-home economic threshold.

10. The computing system of claim 9, wherein the enterprise will not provide ship-to-home services to the one or more delivery locations assigned to the dummy cluster.

11. The computing system of claim 8, further comprising instructions to generate a user interface comprising the plurality of clusters and the selected candidate group.

12. The computing system of claim 8, further comprising instructions to store an output solution to a transload solution database, wherein the output solution comprises the plurality of clusters and the selected candidate group, and wherein the transload solution database is accessible to an enterprise supply chain planning system.

13. The computing system of claim 8, wherein the direct delivery cost comprises: travel distance data, travel time data, delivery vehicle operational cost data, or shipment vehicle capacity data.

14. The computing system of claim 8, wherein the transload delivery cost comprises: travel distance data, travel time data, delivery vehicle operational cost data, fixed transload operational cost data, shipment vehicle capacity data, or transload location capacity data.

15. A method comprising:
- receiving ship-to-home transaction data associated with a time period;
- defining a geographical area in which there are:
  - a plurality of candidate customers for ship-to-home deliveries, each of the plurality of candidate customers having a delivery location; and
  - a warehouse;
- receiving a set of candidate transload locations within the geographical area;
- receiving a number of candidate transload locations to be selected from among the set of candidate transload locations;
- for each candidate group of delivery source locations of a plurality of eligible candidate groups of delivery source locations, wherein the eligible candidate groups of delivery source locations each represent a different combination of candidate transload locations and the warehouse location:
  - grouping the delivery locations of each of the plurality of candidate customers into a plurality of clusters, the plurality of clusters assigning each of the plurality of candidate customers to one of the delivery source locations of the candidate group by minimizing a shipping cost for shipping an item from the warehouse to the delivery location, either directly or via one of the candidate transload locations within the group of delivery locations;
  - wherein minimizing the shipping cost comprises selecting either:
    - a minimized a direct delivery cost of an item from the warehouse to each delivery location; or
    - a minimized transload delivery cost that includes at least (1) a minimized intermediate delivery cost of shipping an item from the warehouse to the one of the candidate transload locations; and (2) a minimized final delivery cost of an item from the one of the candidate transload locations to each delivery location;
  - aggregating shipping costs to each of the delivery locations for the candidate group;
- selecting a candidate group from among the plurality of eligible candidate groups having a lowest aggregated shipping cost to the plurality of candidate customers;
- assigning each delivery location to either the warehouse or to one of the transload locations within the selected candidate group, based on the cluster of the plurality of clusters that the delivery location is grouped into for the selected candidate group;
- determining that a subset of delivery locations should not be assigned to the warehouse or to one of the transload locations within the selected candidate group; and
- receiving, at a transload location of the selected transload locations, an item designated for delivery to a delivery location of the one or more delivery locations,
  - wherein the delivery location is located within a region assigned to the transload location,
  - wherein the item comprises a code comprising electronic information relating to the item, and
  - wherein the electronic information comprises delivery location and a delivery route from the transload location to the delivery location.

16. The method of claim 15, further comprising grouping one or more delivery locations into a dummy cluster based on a determination that the shipping cost associated with each of the one or more delivery locations exceeds a fixed ship-to-home economic threshold.

17. The method of claim 16, wherein the enterprise will not provide ship-to-home services to the one or more delivery locations assigned to the dummy cluster.

18. The method of claim 15, further comprising generating a user interface comprising the plurality of clusters and the selected candidate group.

19. The method of claim 15, further comprising storing an output solution to a transload solution database, wherein the output solution comprises the plurality of clusters and the selected candidate group, and wherein the transload solution database is accessible to an enterprise supply chain planning system.

20. The method of claim 15, wherein:
- the direct delivery cost comprises: distance traveled, time duration of travel, delivery vehicle operational costs, or shipment vehicle capacity; and
- the transload delivery cost comprises: distance traveled, time duration of travel, delivery vehicle operational costs, fixed transload operational costs, shipment vehicle capacity, or transload location capacity.

21. The method of claim 15, wherein selecting the candidate group from among the plurality of eligible candidate groups having a lowest aggregated shipping cost includes comparing a storage volume of each of the transload locations within the selected candidate group to a pre-determined storage volume requirement.

* * * * *